United States Patent
Agrawal et al.

(10) Patent No.: US 10,633,487 B2
(45) Date of Patent: Apr. 28, 2020

(54) INHERENTLY HEALING POLYCARBONATE RESINS

(71) Applicant: SABIC GLOBAL TECHNOLOGIES B.V., Bergen op Zoom (NL)

(72) Inventors: Mukesh Agrawal, Bangalore (IN); Gaurav Mediratta, Bangalore (IN); Gurunath Pozhal Vengu, Bangalore (IN); Arun Sikder, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 17 days.

(21) Appl. No.: 16/074,855

(22) PCT Filed: Feb. 10, 2017

(86) PCT No.: PCT/IB2017/050758
§ 371 (c)(1),
(2) Date: Aug. 2, 2018

(87) PCT Pub. No.: WO2017/137951
PCT Pub. Date: Aug. 17, 2017

(65) Prior Publication Data
US 2019/0040194 A1  Feb. 7, 2019

Related U.S. Application Data

(60) Provisional application No. 62/294,598, filed on Feb. 12, 2016.

(51) Int. Cl.
| | |
|---|---|
| C08G 64/24 | (2006.01) |
| C08G 64/08 | (2006.01) |
| C08G 64/16 | (2006.01) |
| C08L 69/00 | (2006.01) |
| C08J 3/28 | (2006.01) |

(52) U.S. Cl.
CPC ......... *C08G 64/081* (2013.01); *C08G 64/165* (2013.01); *C08G 64/1666* (2013.01); *C08G 64/24* (2013.01); *C08J 3/28* (2013.01); *C08L 69/00* (2013.01); *C08J 2369/00* (2013.01)

(58) Field of Classification Search
USPC ................................................ 528/196, 198
See application file for complete search history.

(56) References Cited

U.S. PATENT DOCUMENTS

| | | | |
|---|---|---|---|
| 4,182,830 A | 1/1980 | Ford, Jr. | |
| 5,260,411 A | 11/1993 | Tesoro et al. | |
| 5,399,658 A | 3/1995 | Archey et al. | |
| 5,453,457 A | 9/1995 | Meltzer et al. | |
| 6,344,523 B1 | 2/2002 | Hawthorne et al. | |
| 6,548,623 B2 | 4/2003 | Brunelle et al. | |
| 6,627,686 B1 | 9/2003 | Sandstrom et al. | |
| 7,079,372 B2 | 7/2006 | Weber et al. | |
| 7,687,595 B2 | 3/2010 | Brunelle et al. | |
| 7,998,529 B2 | 8/2011 | Cheng | |
| 8,846,801 B1 | 9/2014 | Harmon et al. | |
| 2009/0043069 A1 | 2/2009 | Brunelle et al. | |
| 2011/0212334 A1 | 9/2011 | Jolley et al. | |
| 2012/0321828 A1 | 12/2012 | Jolley et al. | |
| 2014/0037964 A1 | 2/2014 | Zheng et al. | |
| 2014/0044964 A1 | 2/2014 | Abad et al. | |

FOREIGN PATENT DOCUMENTS

| | | |
|---|---|---|
| CN | 1371399 A | 9/2002 |
| CN | 104004001 A | 8/2014 |
| CN | 104031248 A | 9/2014 |
| EP | 1191049 A1 | 3/2002 |
| EP | 2899234 A1 | 7/2015 |
| GB | 1241676 A | 8/1971 |
| JP | 2001-064380 A | 3/2001 |
| WO | WO 2006/069282 A2 | 6/2006 |
| WO | WO 2007/125925 A1 | 11/2007 |
| WO | WO 2010/128007 A1 | 11/2010 |
| WO | WO 2014/029966 A1 | 2/2014 |
| WO | WO 2015/127981 A1 | 9/2015 |

OTHER PUBLICATIONS

International Patent Application No. PCT/IB2017/050760; Int'l Preliminary Report on Patentability; dated Nov. 8, 2018; 9 pages.
Rekondo et al.; "Catalyst-free room-temperature self-healing elastomers based on aromatic disulfide metathesis"; Mater. Horiz.; vol. 1; 2014; p. 237-240.
Canadell et al.; "Self-Healing Materials Based on Disulfide Links"; Macromolecules; vol. 44(2); 2011; p. 2536-2541.
Meng et al.; "Crosslinking of poly(arylene disulfide)s and poly(arylene sulfane)s derived from cyclic(arylene disulfide) oligomers"; Applied Polymer; vol. 74 Issue 13; Dec. 1999; p. 3069-3077.
Song et al.; "Short carbon fiber reinforced aromatic polydisulfide derived from cyclic (4,4'-oxybis(benzene)disulfide) via ring-opening polymerization"; Polymers Advanced Technologies; vol. 16 Issue 4; Apr. 2005; p. 323-327.
Hawthorne et al.; "Reduced Temperature Curing of Acetylenic Polyimides"; High Performance Polymers; vol. 11; Mar. 1999; p. 15-26.
International Patent Application No. PCT/IB2017/050760; Int'l Search Report and the Written Opinion; dated May 29, 2017; 13 pages.
Takeda et al.; "Polymer Reaction in Polycarbonate with Na2CO3"; Journal of Applied Polymer Science"; vol. 93; 2004; p. 920-926.
International Patent Application No. PCT/IB2017/050758; Int'l Search Report and the Written Opinion; dated Apr. 10, 2017; 10 pages.
International Patent Application No. PCT/IB2017/050758; Int'l Preliminary Report on Patentability; dated Aug. 23, 2018; 7 pages.

*Primary Examiner* — Terressa Boykin
(74) *Attorney, Agent, or Firm* — BakerHostetler

(57) ABSTRACT

The disclosure concerns healable polycarbonate resins comprising at least about 5 mol % of disulfide units, articles comprising the healable polycarbonate resin, and methods of activating the healable polycarbonate resin by exposing the healable polycarbonate resin to heat or radiation.

19 Claims, 3 Drawing Sheets

◄──── Before ──── Example 2 ──── After ────►

◄──── Before ──── Example 3 ──── After ────►

◄──── Before ──── Example 4 ──── After ────►

INHERENTLY HEALING POLYCARBONATE RESINS

CROSS-REFERENCE TO RELATED APPLICATION

This application is the National Stage of International Application No. PCT/IB2017/050758, filed Feb. 10, 2017, which claims the benefit of U.S. Provisional Application No. 62/294,598 filed Feb. 12, 2016, the disclosures of which are incorporated herein by this reference in their entireties.

TECHNICAL FIELD

The disclosure concerns healable polycarbonates comprising at least about 5% disulfide units.

BACKGROUND

Polycarbonate is a thermoplastic resin which possesses a unique set of physical, mechanical, and thermal properties and, hence, may be used in a variety of application areas. Polycarbonates are characterized by high ductility, optical clarity, high heat, and good dimensional stability. Bisphenol A polycarbonate (BPA) is the predominant commercially available resin in this class, which is derived from 2,2-bis (4-hydroxyphenyl)propane, and ordinarily has a glass transition temperature of about 150° C. However, polycarbonates are susceptible to the mechanical forces, especially in outdoor applications, and, thus, may develop scratches and cracks over the time leading to poor surface aesthetics and in some cases, failure of structural integrity.

Healing materials represent a class of the smart materials which have the ability to repair damages. In order to introduce this unique property, polymer substrates may be coated with a healing layer. However, healing layers offer healing properties only to the surface and cannot repair the damages developed in the bulk of the material. Moreover, healing layers often contain solvents and surfactants, which result in a high initial haze of the polycarbonate, making it ill-suited for many applications. Polymer resins may also be mixed with healing agents such as those encapsulated in capsules and catalysts. However, the presence of such foreign materials in the polycarbonate matrix affects other key properties such as transparency. Moreover, such healing systems are driven by irreversible reactions and, therefore, are not effective for repairing multiple events of the damages.

Several approaches have been utilized in an attempt to produce healing polycarbonate materials. For example, U.S. Pat. No. 8,846,801 discloses the use of polyurethane incorporated with carbon nanotubes to introduce intrinsic healing property into polycarbonates while maintaining exceptional mechanical properties and shape-memory. However, the presence of carbon nanotubes may affect other key properties such transparency of the polycarbonate material and limit the applications of the resulting composition. U.S. Pat. No. 7,998,529 discloses haze free and healing coatings on polycarbonate substrates, wherein two isocyanate groups per mole of polycarbonate have been introduced into the polymer backbone and the resulting substrate has been coated with a polyisocyanate healing agents. US Patent Publication No. 2014/0037964 discloses the coating of a healing material on polycarbonate substrates, wherein the healing layer is composed of the mixture of a polycarbonate polyol, a polyisocyanate, a solvent and a surfactant. However, such systems are not capable of multiple healings of damages since the healing mechanism is driven by irreversible crosslinking mechanisms.

It is desirable to develop polycarbonate resins which are capable of healing without any catalysts and can accomplish multiple healings of damages over time.

SUMMARY

In some aspects, the disclosure concerns healable polycarbonate resins comprising at least about 5 mol % of disulfide units. In certain embodiments, the polycarbonate resins comprise about 20 to about 30 mol % of aromatic disulfide units.

Other aspects of the disclosure relate to methods of preparing a healable polycarbonate resin comprising, for example, melt or interfacial polymerization of an aromatic disulfide comprising at least one hydroxyl group and optionally a carbonate source such as bis(methyl salicylate)carbonate or diphenyl carbonate.

The disclosure also concerns articles comprising the healable polycarbonate resin described herein as well as methods of activating a healable polycarbonate resin described herein by exposing the healable polycarbonate resin to heat and/or radiation.

DETAILED DESCRIPTION OF ILLUSTRATIVE EMBODIMENTS

Figure 1:
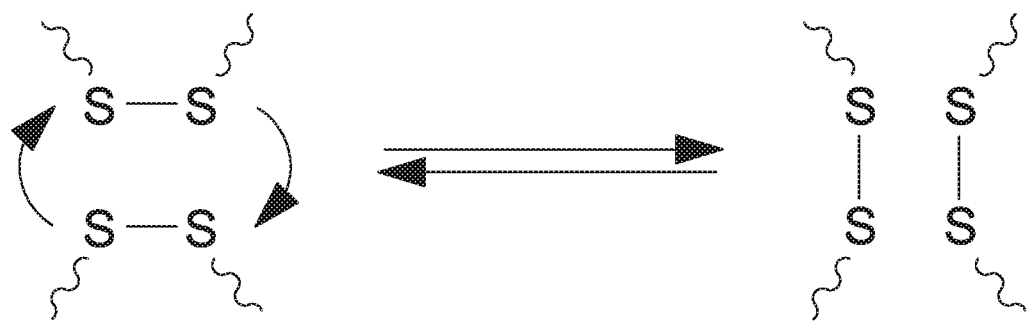
FIG. 1 is the proposed mechanism for the healing process of disulfide-containing polycarbonates.

As described herein, healing polycarbonate resins were prepared and demonstrate healing properties. The term "heal" as used herein refers to the ability of a polymer to repair damage to the polymer backbone. The healing properties of the polycarbonate resins are attributed to the ability of a first sulfur-sulfur bond to undergo metathesis with a second sulfur-sulfur bond (see, e.g., FIG. 1). In some embodiments, the first and second sulfur-sulfur bonds are within the same polycarbonate molecule. In other embodiments, the first and second sulfur-sulfur bonds are in different polycarbonate molecules. The location of the sulfur-sulfur bond, e.g., within the polycarbonate molecule, on one or both ends of the polycarbonate molecule, and/or linking two or more polycarbonate molecules, does not affect the metathesis involved with healing damage in the polycarbonate.

The damage to the polymer may be microscopic or macroscopic, i.e., viewable to the eye and is the result of the breaking of chemical bonds within the polymer. In some embodiments, the damage is due to cleavage of sigma bonds, hemolytic bonds, heterolytic bonds. In other embodiments, the damage is due to microcracks which are formed from damaging neighboring polymer chains. In further embodiments, the damage is due to losing interactions such as hydrogen bonding, metal coordination, and van der Waals forces in the polymer. The damage to the polycarbonate resin may be on the surface and/or within the bulk portion of the resin, e.g., within and beneath the surface of the resin. Further, the damage may occur at substantially the same location as other points of damage on or within the resin or may occur at another location on or within the resin. In addition to the healing properties, the polycarbonates have good impact properties, heat properties, and/or flow characteristics.

The polycarbonates described herein are typically healed upon activation. The term "activation" refers to initiating the disulfide metathesis as described above and in FIG. 1 at one or more locations in the resin. In some embodiments, healing of the polycarbonates is activated using heat and/or radiation. The temperature, i.e., "healing temperature", required to heal the polycarbonate resin is a temperature which is greater than the glass transition temperature ($T_g$) of the polycarbonate resin and will depend on the particular polycarbonate resin prepared. In some embodiments, the temperature required to heal the polycarbonate resin is about 30 to about 80° C. (Celsius) above the $T_g$. In other embodiments, the temperature required to heal the polycarbonate resin is about 35 to about 40° C. The healing temperature is typically less than the processing temperature at which the polycarbonate resin flows smoothly. For example, polycarbonate is typically processed as about 300° C. When radiation is used, alternatively or in combination with heat, to heal the polycarbonate, the radiation has a wavelength between about 350 to about 550 nm (nanometer).

Advantageously, the polycarbonate resins are capable of healing in the absence of healing agents, healing layers, catalysts, pressure, electricity, pH and/or fillers such as carbon nanotubes to accelerate the healing mechanism. Healing agents include agents which polymerize, i.e., monomers, in response to the generation of a crack in a polymer resin. Healing agents are customarily incorporated into the bulk form of the polymer or may be present in a polymer layer applied to a substrate, i.e., a healing layer. "Carbon nanotubes" refer to allotropes of carbon with a cylindrical nanostructure which may be incorporated into polymer matrices in an effort to increase the strength of the polymer matrix and mitigate the formation of microcracks in the polymer matrix.

The polycarbonate resins of the present disclosure are capable of being healed in connection with multiple events of damage. The term "multiple" as used herein refers to the ability of the polycarbonate resin to heal damage (e.g. cracks) over multiple cycles, including damage occurring at substantially the same location of a previously healed area of the resin. For example, the polycarbonate resins are capable of healing following a single event of damage, and can also heal following multiple events of damage at approximated the same site, including, for example, at least about 5, 10, 15, 20, or 25 events.

I. Definitions

It is to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate" includes mixtures of two or more polycarbonates.

The term "combination" is inclusive of compositions, blends, mixtures, alloys, reaction products, and the like.

As used herein, "alkyl" refers to a saturated hydrocarbon group which is straight-chained or branched. Examples of alkyl groups include, without limitation, methyl, ethyl, propyl (e.g., n-propyl and isopropyl), butyl (e.g., n-butyl, i-butyl, s-butyl, t-butyl), pentyl (e.g., n-pentyl, i-pentyl, n-pentyl). An alkyl group can contain from 1 to about 20, from 2 to about 20, from 1 to about 10, from 1 to about 8, from 1 to about 6, from 1 to about 4, or from 1 to about 3 carbon atoms. By way of example, "$C_{1-6}$ alkyl" refers to an alkyl group having from 1 to 6 carbon atoms.

As used herein, "cycloalkyl" refer to a saturated, cyclic hydrocarbon group. Examples of cycloalkyl groups include, without limitation, cyclopropyl, cyclobutyl, cyclopentyl, cyclohexyl, cycloheptyl, cyclooctyl, among others. A cycloalkyl group can contain from 3 to about 20, from 3 to about 10, from 3 to about 8, or from 4 to about 6.

As used herein, "aryl" refers to refers to aromatic carbocyclyl groups including monocyclic or polycyclic aromatic hydrocarbons such as, for example, phenyl, naphthyl, anthracenyl, phenanthrenyl, indanyl, indenyl, and the like. In some embodiments, aryl groups have from 4 to about 18 carbon atoms, from 5 to 10, or 5 to 7 carbon atoms.

As used herein, "alkaryl" refers to an alkyl moiety as described above substituted by an aryl group, both described above. Example aralkyl groups include benzyl and naphthylmethyl groups.

As used herein. "alkoxy" refers to an —O-alkyl group, where alkyl is defined above. Examples of alkoxy groups include methoxy, ethoxy, propoxy (e.g., n-propoxy and i-propoxy), t-butoxy, and the like. "Aryloxy" refers to an —O-aryl group, wherein aryl is defined above. Examples of aryloxy groups include, without limitation, —O-phenyl, —O-naphthyl, —O-anthracenyl, —O-phenanthrenyl, —O-indanyl, —O-indenyl, and the like. "Cycloalkoxy" refers to an —O— cycloalkyl group, wherein cycloalkyl is defined above. Examples of cycloalkoxy groups include, without limitation, —O-cyclopropyl, —O-cyclobutyl, —O-cyclopentyl. —O-cyclohexyl. —O— cycloheptyl, —O-cyclooctyl, among others.

As used herein, "alkylamino" refers to a —NH(alkyl) or —N(alkyl)$_2$ group, wherein alkyl is defined above and the alkyl groups may be independently selected. "Arylamino" refers to a —NH(aryl) or —N(aryl)$_2$ group, wherein aryl is defined above and the aryl groups may be independently selected. "Cycloalkylamino" refers to a —NH(cycloalkyl) or —N(cycloalkyl)$_2$ group, wherein cycloalkyl is defined above and the cycloalkyl groups may be independently selected.

As used herein "alkylaminocarbonyl" refers to a —C(O)N(alkyl)- group, wherein the alkyl group is defined above and the point of attachments are through the carbon and nitrogen atoms. "Arylaminocarbonyl" refers to a —C(O)N(aryl)- group, wherein the aryl group is defined above and the point of attachments are through the carbon and nitrogen atoms. "Cycloalkylaminocarbonyl" refers to a —C(O)N (cycloalkyl)- group, wherein the cycloalkyl group is defined above and the point of attachments are through the carbon and nitrogen atoms.

As used herein, "alkoxycarbonyl" and "carboalkoxy" are interchangeable group and refer to a —C(O)(alkoxy) group, where alkoxy is defined above. "Aryloxycarbonyl" refers to a —C(O)(aryloxy) group, wherein aryloxy is defined above. "Cycloalkoxycarbonyl" refers to a —C(O)(cycloalkoxy) group, where cycloalkoxy is defined above.

As used herein, "alkylthio" refers to a —S-alkyl group, where alkyl is defined above. "Arylthio" refers to a —S-aryl group, where aryl is defined above. "Cycloalkylthio" refers to a —S— cycloalkyl group, where cycloalkyl is defined above.

As used herein, "acylamino" refers to a —C(O)NH- moiety.

As used herein, "alkylsulfinyl" refers to —SO-alkyl, wherein alkyl is defined above. "Arylsulfinyl" refers to —SO-aryl, wherein aryl is defined above. "Cycloalkylsulfinyl" refers to —SO-cycloalkyl, wherein cycloalkyl is defined above.

As used herein, "alkylsulfonyl" refers to —$SO_2$-alkyl, wherein alkyl is defined above. "Arylsulfonyl" refers to —$SO_2$-aryl, wherein aryl is defined above. "Cycloalkylsulfonyl" refers to —$SO_2$-cycloalkyl, wherein cycloalkyl is defined above.

As used herein, "halogen", "halo", or "halide" are used interchangeably and refer to F, Cl, Br, and I.

As used herein, "formate" refers to $HCO_2^-$, bicarbonate refers to $HCO_3^-$, carbonate refers to $CO_3^{2-}$, carboxylate refers to $CO_2^-$, sulfone refers to —$SO_2$—, sulfoxide refers to —SO—, -sulfonate refers to $SO_3^{2-}$, and sulfate refers to $SO_4^{2-}$.

As used herein, "substituted" refers to where at least one hydrogen atom of a chemical group is replaced by a non-hydrogen moiety. Example substituents include OH, oxo, $C_{1-6}$ alkyl, $C_{1-6}$ alkoxy, aryl, $C_{1-6}$ alkaryl, halogen, $C_{1-6}$ haloalkyl, or aryl.

The terms "about" and "at or about" mean that the amount or value in question can be the value designated some other value approximately or about the same. It is generally understood, as used herein, that it is the nominal value indicated ±5% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the molecular weight for a given polymer refers to the weight average molecular weight ($M_w$). The $M_w$ recited herein is determined by gel permeation chromatography using the following equation, where $M_i$ is the molecular weight of a chain and $N_i$ is the number of chains of that molecular weight.

$$M_w = \frac{\sum N_i M_i^2}{\sum N_i M_i}$$

The term "unit" as used herein refers to a portion of the polycarbonate chain. The polycarbonate chain contains multiple units. Accordingly, the polycarbonate resin described herein is comprised of multiple polycarbonate units which may be separate from each other (not bound together chemically) or are attached (bound together chemically). Each unit is typically repeated in the polymer chain, i.e., "repeat unit". The polycarbonate units are derived from the one or more monomers discussed herein. Accordingly, the polycarbonate may contain units from one, two, three, four or more monomers in varying amounts and having varying $M_w$ as defined above.

Ranges can be expressed herein as from one particular value to another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

The described compounds are defined herein using structural formulas that do not specifically recite the mass numbers or the isotope ratios of the constituent atoms. It is intended that the present application includes compounds in which the constituent atoms are present in any ratio of isotope forms. For example, carbon atoms may be present in any ratio of $^{12}C$, $^{13}C$, and $^{14}C$; hydrogen atoms may be present in any ratio of $^1$H, $^2$H, and $^3$H among others. In one embodiment, the constituent atoms in the compounds of the present application are present in their naturally occurring ratios of isotope forms.

Unless otherwise stated to the contrary herein, all test standards are the most recent standard in effect at the time of filing this application.

II. Polycarbonate Resins

The terms "polycarbonate" as used herein includes polymers containing a carbonate repeating unit. The polycarbonate may include at least one, two, three, four, five or more repeating units, provided that a carbonate moiety is present. In some embodiments, a polycarbonate described herein is a homopolycarbonate, copolycarbonate, terpolycarbonate, among others.

The healable polycarbonate resin contains at least about 5 mol % to about 50 mole % of disulfide units, e.g., as the monomer, co-monomer, end-cap, crosslinker, or combinations thereof. In some embodiments, the healable polycarbonate resin contains about 10 mol % to about 50 mol % of disulfide units. In further embodiments, the healable polycarbonate resin contains about 15 mol % to about 40 mol % of disulfide units. In other embodiments, the healable polycarbonate resin contains about 15 mol % to about 25 mol % of disulfide units. In yet further embodiments, the healable polycarbonate resin contains about 20 mol % to about 30 mol % of disulfide units.

The disulfide units may be present within the polycarbonate polymer chain, i.e., co-monomer, on one or both ends of the polycarbonate polymer chain, i.e., end-caps, or may bridge two or more polycarbonate polymer chain, i.e., cross-linkers. In some embodiments, the disulfide units comprise disulfide co-monomer fragments. In other embodiments, the disulfide units comprise optionally substituted bis phenol fragments. In further embodiments, the disulfide units comprise optionally substituted bis(4-hydroxyphenyl) disulfide fragments of the following structure:

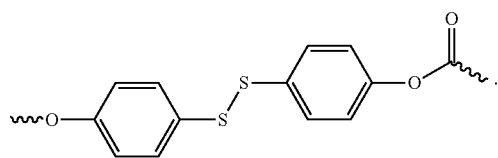

In yet other embodiments, the disulfide units comprise disulfide end caps. In still further embodiments, the disulfide units comprise optionally substituted 4-(phenyldisulfanyl) phenol disulfide units of the following structure:

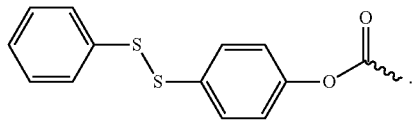

In other embodiments, the disulfide unit comprises a disulfide cross-linker. In some embodiments, the disulfide unit contains at least 3 hydroxy moieties. In further embodiments, the disulfide unit comprises optionally substituted 4,4',4''-((ethane-1,1,1-triyl-tris(benzene-4,1-diyl))tris(disulfanediyl))triphenol] of the following structure

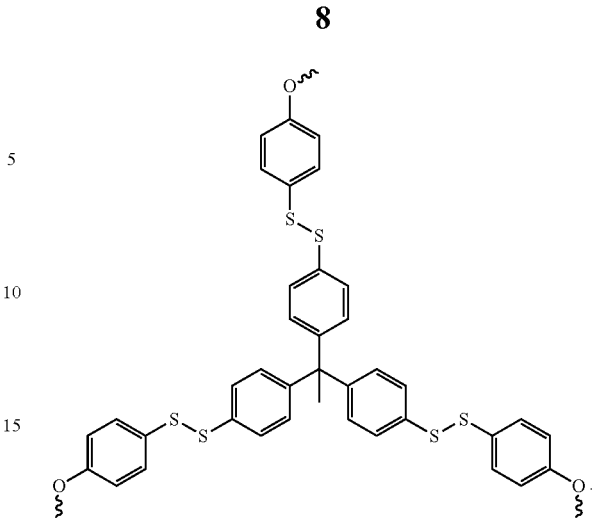

The disulfide units may be any disulfide linkage which undergoes metathesis with another disulfide linkage. In some embodiments, the disulfide unit comprises aromatic or aliphatic disulfide units. The term "aromatic" as used herein refers to a chemical group which contains localized sigma bonds and delocalized pi bonds. In some embodiments, the aromatic disulfide unit is a cyclic, aromatic group. In other embodiments, the aromatic disulfide unit is an optionally substituted phenyl disulfide. The term "aliphatic" as used herein refers to a chemical group which contains localized sigma bonds. In some embodiments, the aliphatic disulfide unit is an acyclic or cyclic disulfide. In other embodiments, the aliphatic disulfide unit is an optionally substituted alkyl or cycloalkyl disulfide.

The polycarbonate resins are synthesized in the presence of a carbonate source. The carbonate source may be, for example, those used in the art including those described in U.S. Pat. No. 6,548,623. In certain embodiments, the carbonate source is an activated carbonate such as bismethylsalicylcarbonate (BMSC). However, as used herein the term "activated carbonate" is defined as a diarylcarbonate which is more reactive than diphenylcarbonate toward transesterification reactions. Such activated carbonates are of the general formula shown below, wherein Ar is a substituted a $C_6$ to $C_{30}$ aromatic moiety.

Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Unsymmetrical combinations of these structures, where the substitution number and type on A and A' are different, are also possible to employ. In one embodiment, the carbonate source is an ester-substituted diarylcarbonate having the structure:

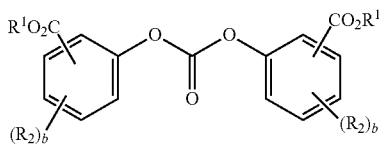

wherein $R^1$ is, independently, $C_1$ to $C_{10}$ alkyl, $C_4$ to $C_{20}$ cycloalkyl, or $C_4$ to $C_{20}$ aryl; $R^2$ is, independently, halogen, CN, $NO_2$, $C_1$ to $C_{20}$ alkyl, $C_4$ to $C_{20}$ cycloalkyl, $C_4$ to $C_{20}$ aryl, $C_1$ to $C_{20}$ alkoxy, $C_4$ to $C_{20}$ cycloalkoxy, $C_4$ $C_{20}$ aryloxy, $C_1$ to $C_{20}$ alkylthio, $C_4$ to $C_{20}$ cycloalkylthio, $C_4$ to $C_{20}$ arylthio, $C_1$ to $C_{20}$ alkylsulfinyl, $C_4$ to $C_{10}$ cycloalkylsulfinyl, $C_4$ to $C_{10}$ arylsulfonyl, $C_1$ to $C_{20}$ alkylsulfonyl, $C_4$ to $C_{10}$ cycloalkylsulfonyl, $C_4$ to $C_{20}$ arylsulfonyl, $C_1$ to $C_{20}$ alkoxycarbonyl, $C_4$ to $C_{20}$ cycloalkoxycarbonyl, $C_4$ to $C_{20}$ aryloxycarbonyl, $C_2$ to $C_{60}$ alkylamino, $C_6$ to $C_{60}$ cycloalkylamino, $C_5$ to $C_{60}$ arylamino, $C_1$ to $C_{40}$ alkylaminocarbonyl, $C_4$ to $C_{40}$ cycloalkylaminocarbonyl, $C_4$ to $C_{40}$ arylaminocarbonyl, or $C_1$ to $C_{20}$ acylamino, and b is, independently, an integer of 0 to 4. At least one of the substituents $CO_2R^1$ may be attached in an ortho position relative to the carbonate group. In one embodiment, the ester-substituted diarylcarbonates include, but are not limited to, BMSC, bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. In another embodiment, the ester-substituted diarylcarbonate is BMSC.

Some non-limiting examples of non-activating groups which, when present in an ortho position relative to the carbonate group, would not be expected to result in activated carbonates are alkyl, cycloalkyl or CN groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate or bis(o-cyanophenyl)carbonate. Unsymmetrical combinations of these structures are also expected to result in non-activated carbonates.

Unsymmetrical diarylcarbonates wherein one aryl group is activated and one aryl is unactivated or de-activated would also be useful herein if the activating group renders the diaryl carbonate still more reactive than diphenyl carbonate.

In another embodiment, the carbonate source is an ester-substituted phenol (i.e. activated carbonate residue) having the structure:

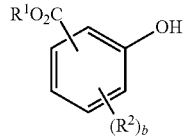

wherein $R^1$ is $C_1$ to $C_{20}$ alkyl, $C_4$ to $C_{20}$ cycloalkyl, or $C_4$ to $C_{20}$ aryl; $R^2$ is, independently, halogen, CN, $NO_2$, $C_1$ to $C_{20}$ alkyl, $C_4$ to $C_{20}$ cycloalkyl, $C_4$ to $C_{20}$ aryl, $C_1$ to $C_{20}$ alkoxy, $C_4$ to $C_{20}$ cycloalkoxy, $C_4$ to $C_{20}$ aryloxy, $C_1$ to $C_{20}$ alkylthio, $C_4$ to $C_{20}$ cycloalkylthio, $C_4$ to $C_{20}$ arylthio, $C_1$ to $C_{20}$ alkylsulfinyl, $C_4$ to $C_{20}$ cycloalkylsulfinyl, $C_4$ to $C_{20}$ arylsulfinyl, $C_1$ to $C_{20}$ alkylsulfonyl, $C_4$ to $C_{20}$ cycloalkylsulfonyl, $C_4$ to $C_{20}$ arylsulfonyl group, $C_1$ to $C_{20}$ alkoxycarbonyl, $C_4$ to $C_{20}$ cycloalkoxycarbonyl, $C_4$ to $C_{20}$ aryloxycarbonyl, $C_2$ to $C_{60}$ alkylamino, $C_6$ to $C_{60}$ cycloalkylamino, $C_5$ to $C_{60}$ arylamino, $C_1$ to $C_{40}$ alkylaminocarbonyl, $C_4$ to $C_{40}$ cycloalkylaminocarbonyl, $C_4$ to $C_{40}$ arylaminocarbonyl, or $C_1$ to $C_{20}$ acylamino; and b is an integer of 0 to 4.

The carbonate source may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, among others. Non-limiting examples of dicarboxylic acid esters include diphenyl sebacate, diphenyl terephthalate, diphenyl isophthalate, diphenyl decanedioate, diphenyl dodecanedioate, among others. Non-limiting examples of dicarboxylic acid halides include terephthaloyl chloride, isophthaloyl chloride, sebacoyl chloride, decanedioyl chloride, dodecanedioyl chloride, among others.

The polycarbonate resin also contains a second, optionally substituted co-monomer. The co-monomer, although it may be selected by one skilled in the art, must be capable being co-polymerized with the disulfide unit. e.g., disulfide co-monomer, disulfide end-cap, disulfide crosslinking agent, or combination thereof. In some embodiments, the co-monomer contains at least one —O— moiety. In other embodiments, the co-monomer contains at least two —O— moieties. In further embodiments, the co-monomer is a dihydroxy compound.

The dihydroxy compound may be an aliphatic diol and/or acid. Aliphatic diols may include, without limitation, isosorbide (1,4:3,6-dianhydro-D-sorbitol), tricyclodecane-dimethanol, 4,8-bis(hydroxymethyl)tricyclodecane, tetramethyl-cyclobutanediol, 2,2,4,4,-tetramethylcyclobutane-1,3-diol, cis/trans-1,4-cyclohexanedimethanol, cis/trans-1,4-bis(hydroxymethyl)cyclohexane, cyclohex-1,4-ylenedimethanol, trans-1,4-cyclohexanedimethanol, trans-1,4-bis(hydroxymethyl)cyclohexane, cis-1,4-cyclohexanedimethanol, cis-1,4-bis(hydroxymethyl)cyclohexane, cis-1,2,-cyclohexanedimethanol, 1,1'-bi(cyclohexyl)-4,4'-diol, dicyclohexyl-4,4'-diol, 4,4'-dihydroxydicyclohexyl, or poly(ethylene glycol). Aliphatic acids may include, without limitation, 1,10-dodecanedioic acid, adipic acid, hexanedioic acid, isophthalic acid, 1,3-benzenedicarboxylic acid, terephthalic acid, 1,4-benzenedicarboxylic acid, 2,6-naphthalenedicarboxylic acid, 3-hydroxybenzoic acid, or 4-hydroxybenzoic acid.

The dihydroxy compound may be a dihydroxy aromatic compound. In some embodiments, the dihydroxy aromatic compound has the following structure:

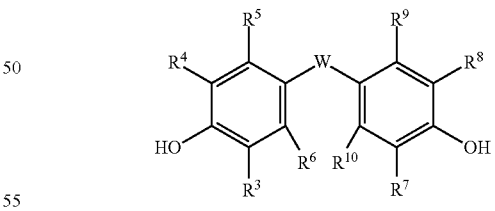

wherein $R^3$ to $R^{10}$ are, independently, H, halogen, $NO_2$, CN, $C_1$ to $C_{20}$ alkyl, $C_4$ to $C_{20}$ cycloalkyl, or $C_6$ to $C_{20}$ aryl; W is a bond, O, O, $SO_2$ group, $C_1$ to $C_{20}$ alkyl, $C_6$ to $C_{20}$ aryl, $C_6$ to $C_{20}$ cycloalkyl, or $R^{12}$—C—$R^{11}$, wherein $R^{11}$ and $R^{12}$ are, independently, H, $C_1$ to $C_{20}$ alkyl, $C_4$ to $C_{20}$ cycloalkyl, or $C_4$ to $C_{20}$ aryl; or $R^{11}$ and $R^{12}$ together form a $C_4$ to $C_{20}$ cycloalkyl which is optionally substituted by one or more $C_1$ to $C_{20}$ alkyl, $C_6$ to $C_{20}$ aryl, $C_5$ to $C_{21}$ aralkyl, $C_5$ to $C_{20}$ cycloalkyl, or a combination thereof.

The dihydroxy aromatic compound may be of the structure:

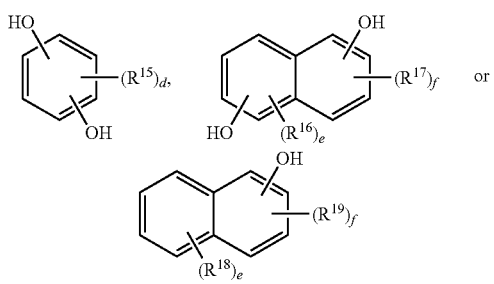

wherein $R^{15}$ is, independently, H, halogen, $NO_2$, CN, $C_1$ to $C_{20}$ alkyl, $C_4$ to $C_{20}$ cycloalkyl, or $C_4$ to $C_{20}$ aryl, d is an integer of 0 to 4; $R^{16}$, $R^{17}$, $R^{18}$ and $R^{19}$ are, independently, H, halogen, $NO_2$, CN, $C_1$ to $C_{20}$ alkyl, $C_4$ to $C_{20}$ cycloalkyl, or $C_4$ to $C_{20}$ aryl; e and f are integers of 0 to 3, g is an integer of 0 to 4, and h is an integer of 0 to 2.

In yet other embodiments, the dihydroxy compound is a dihydroxy aromatic compound. In one aspect, the dihydroxy aromatic compound is a bisphenol. Suitable bisphenols include, without limitation, 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane, 11-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane, 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexan; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,35-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, or 1,4-bis(2-(4-hydroxy-3-methylphenyl)-2-propyl)benzene.

In further embodiments, the dihydroxy aromatic compound is a dihydroxy benzene. Suitable dihydroxy benzenes include, without limitation, hydroquinone, resorcinol, methylhydroquinone, butylhydroquinone, phenylhydroquinone, 4-phenylresorcinol and 4-methylresorcinol.

In yet other embodiments, the dihydroxy aromatic compound is a dihydroxy naphthalene. Suitable dihydroxy naphthalenes include, without limitation, 2,6-dihydroxy naphthalene; 2,6-dihydroxy-3-methyl naphthalene; 2,6-dihydroxy-3-phenyl naphthalene; 1,4-dihydroxy naphthalene; 1,4-dihydroxy-2-methyl naphthalene, 1,4-dihydroxy-2-phenyl naphthalene and 1,3-dihydroxy naphthalene.

In still further embodiments, the dihydroxy compound is N-phenyl phenolphthalein, an acid having at least about 20 carbon atoms and 2 hydroxy groups, or

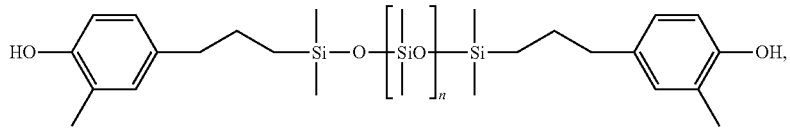

wherein n is about 20 to about 200, or combinations thereof. In further embodiments, the carbonate source is sebacic acid.

In further embodiments, the polycarbonate contains a bisphenol A unit. In other embodiments, the polycarbonate contains a bis(methyl salicylate)carbonate unit. In yet further embodiments, the polycarbonate contains one or more of the following units.

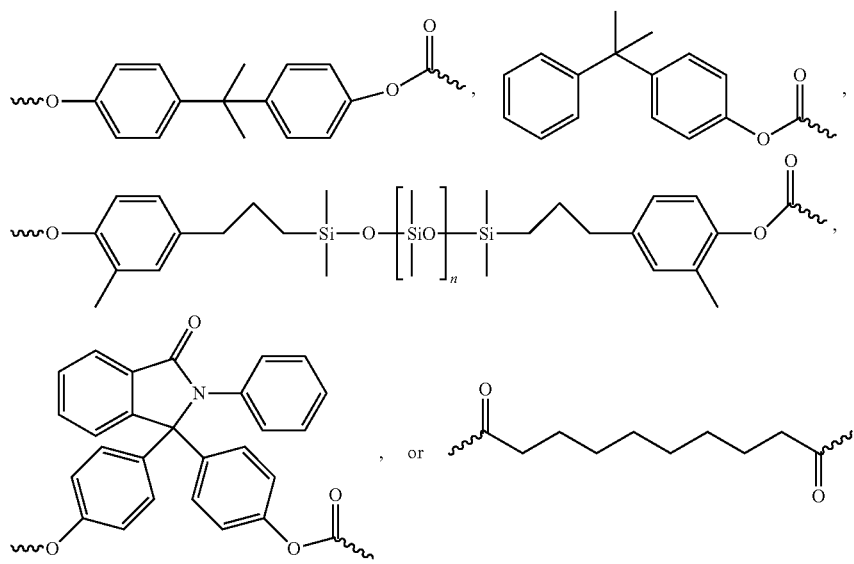

The polycarbonate resin described herein may be a homopolycarbonate, i.e., contains the same monomer repeating unit. In some embodiments, the polycarbonate resin has the following structure, wherein n is about 30 to about 325, more particularly about 100 to about 250. Accordingly, this corresponds to a polycarbonate resin having a $M_w$ of about 10.000 to about 100.000, more particularly about 30,000 to about 60,000.

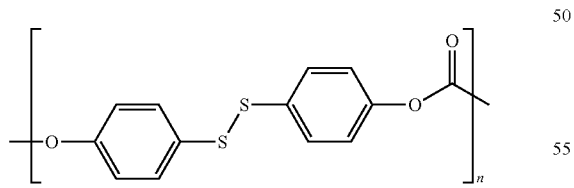

The polycarbonate resin may also be a copolycarbonate resin, i.e., contains two monomer repeating units. One monomer repeating unit is a disulfide unit as described above and the other monomer repeating unit is a co-monomer as described above. In some embodiments, the polycarbonate resin has the following structure, wherein x is about 5 to about 95 mol %, more particularly about 70 to about 95 mol %, y is about 5 to about 95 mole %, more particularly about 1 to about 30 mol %, and $M_w$ is about 10,000 to about 100,000 g/mol, more particularly about 30.000 to about 60,000 g/mol.

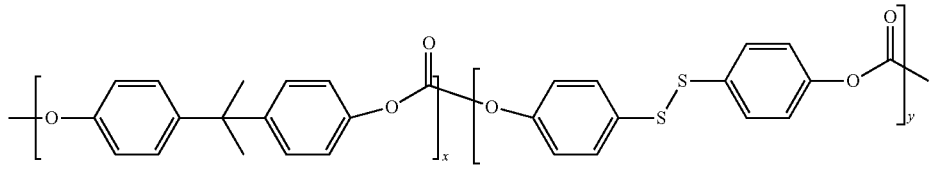

In other embodiments, the polycarbonate resin has the following structure, wherein n is an integer such that $M_w$ is about 10,000 to about 100,000 g/mol, more particularly about 30,000 to about 60,000 g/mol.

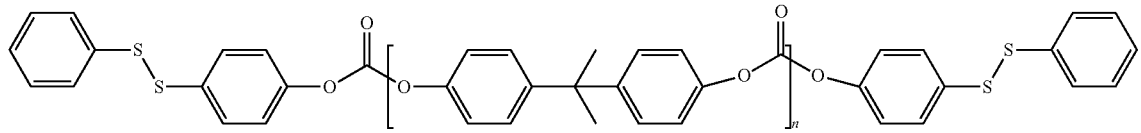

The polycarbonate resin may further be a terpolymer, i.e., contains three monomer repeating units. One monomer repeating unit is a disulfide unit as described above, a second monomer repeating unit is a first co-monomer repeating unit as described above, and second co-monomer repeating unit may be selected by those skilled in the art. In some embodiments, the second co-monomer repeating unit may be selected from the co-monomers described above and differ from the first co-monomer. In other embodiments, the polycarbonate resin is a terpolymer of the following structure, wherein n is about 20 to about 60 mol %, more particularly about 30 to about 50 mol %, x is about 1 to about 60 mol %, more particularly about 20 to about 50 mol %, y is about 1 to about 10 mol %, more particularly about 2 to about 7 mol %, z is about 1 to about 50 mol %, more particularly about 20 to about 40 mol %, and $M_w$ is about 10,000 to about 100,000 g/mol, more particularly about 30,000 to about 60,000 g/mol.

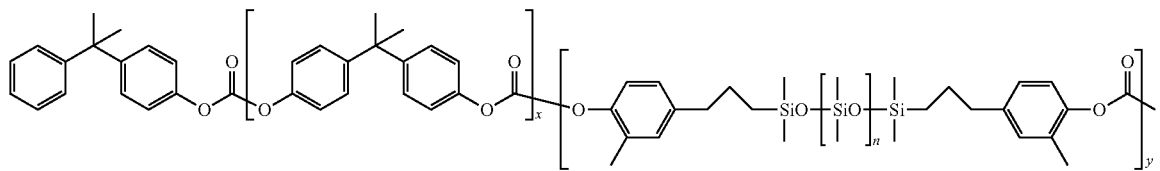

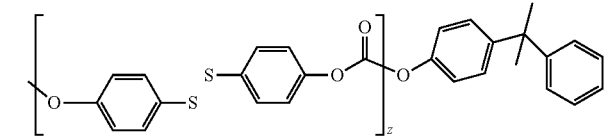

In certain embodiments, the polycarbonate resin is a terpolymer of the following structure, wherein x is about 1 to about 50 mol %, more particularly about 20 to about 40 mol %, y is about 1 to about 30 mol %, more particularly about 5 to about 25 mol %, z is about 1 to about 30 mol %, more particularly about 1 to about 15 mol %, and $M_w$ is about 10,000 to about 100,000 g/mol, more particularly about 30,000 to about 60,000 g/mol.

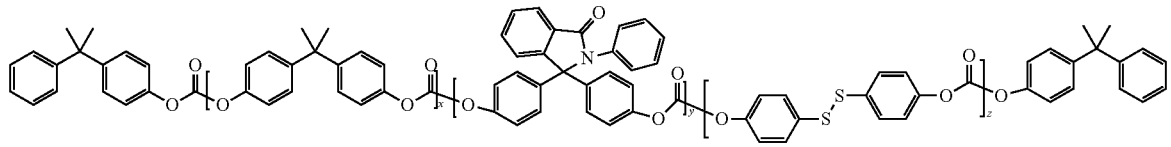

In further embodiments, the polycarbonate resin is a terpolymer of the following structure, wherein x is about 1 to about 60 mol %, more particularly about 20 to about 50 mol %, y is about 1 to about 10 mol %, more particularly about 2 to about 7 mol %, z is about 1 to about 30 mol %, more particularly about 1 to about 15 mol %, and $M_w$ is about 10,000 to about 100,000 g/mol, more particularly about 30,000 to about 60,000 g/mol.

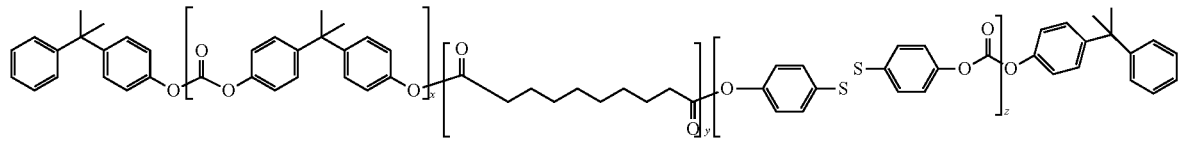

III. Preparation Methods

The polycarbonates described herein may be prepared using techniques known to those skilled in the art such as melt or interfacial polymerization. In some embodiments, the polycarbonates are prepared using melt polymerization. As discussed above and shown below, the disulfide reagent can be utilized in, without limitation, four approaches (a) monomer, (b) co-monomer (c) end capper, (d) cross-linker, or combinations thereof. The reaction can occur in one or more reactors using varying temperatures, pressures, catalysts, agitation rates, vessels, among others, all of which may be dependent on the particular disulfide, carbonate source, and optional dihydroxy compound selected. The term "catalyst", when used in reference to the preparation of the polycarbonate, differs from the catalysts which are used in the art to effect healing of a polycarbonate. Accordingly, catalysts may be used during the reactions for preparing the polycarbonate.

When melt polymerization is utilized, the polycarbonate resin may be formed by reacting a disulfide reagent and a carbonate source. In other embodiments, the polycarbonate resin may be formed by reacting a disulfide reagent, carbonate source, and at least one co-monomer. This reaction can be catalyzed by, for example, a suitable catalyst such as tetra methyl ammonium hydroxide, tetrabutyl phosphonium acetate, or sodium hydroxide (NaOH), among others.

As discussed above, the disulfide reagent may be utilized as a (a) monomer, (b) co-monomer, (c) end capper and/or (d) cross-linker. In some embodiments, the disulfide reagent contains a disulfide unit as described above. In other embodiments, the disulfide reagent contains one, two, or more hydroxy groups. In further embodiments, the disulfide reagent is an optionally substituted bis phenol. In yet other embodiments, the disulfide reagent is bis(4-hydroxyphenyl) disulfide of the following structure:

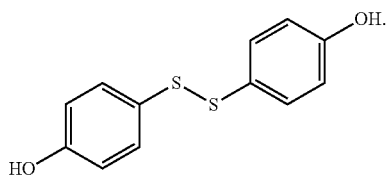 [SMILES: Oc1ccc(SSc2ccc(O)cc2)cc1]

The disulfide reagent also may be an endcapper. In some embodiments, the disulfide reagent contains one hydroxy group. In other embodiments, the disulfide reagent is an optionally substituted phenol. In further embodiments, the disulfide reagent is 4-(phenyldisulfanyl)phenol disulfide of the following structure:

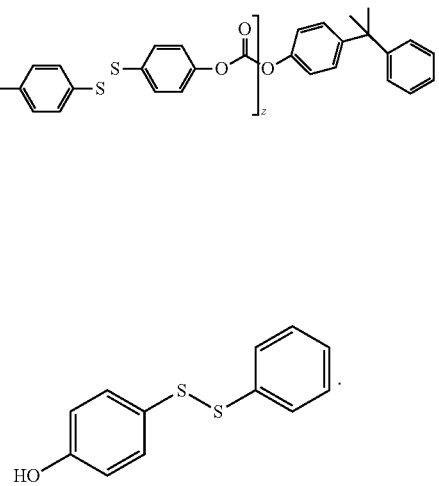

The disulfide reagent may also be a crosslinker. In some embodiments, the disulfide reagent comprises at least 3 hydroxy groups. In further embodiments, the disulfide reagent is 4,4',4''-((ethane-1,1,1-triyl-tris(benzene-4,1-diyl)) tris(disulfanediyl))triphenol] of the following structure:

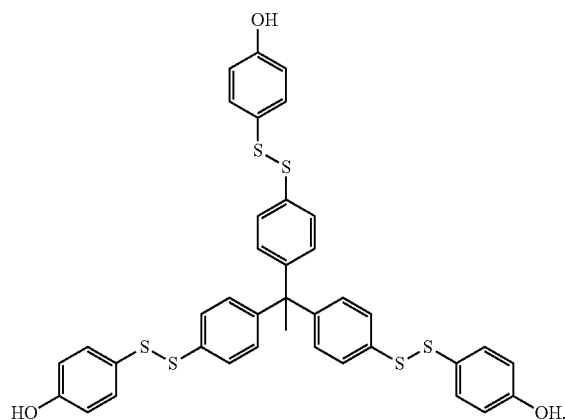 [SMILES: CC(c1ccc(SSc2ccc(O)cc2)cc1)(c1ccc(SSc2ccc(O)cc2)cc1)c1ccc(SSc2ccc(O)cc2)cc1]

As set forth above, the polycarbonates described herein are prepared by polymerizing a disulfide reagent. When homopolycarbonates are prepared, the disulfide reagent is the bulk of the polycarbonate resin and produces a polycarbonate resin containing disulfide units throughout the polymer. The homopolycarbonate resin is prepared by reacting the disulfide reagent with a carbonate source selected from those discussed above. See, Scheme 1 which illustrates the preparation of a repeat unit in a healable homo-polycarbonate described herein. In this scheme, the carbonate source and disulfide reagent (where the curved bond indicates the presence of another group) are defined above.

Scheme 1

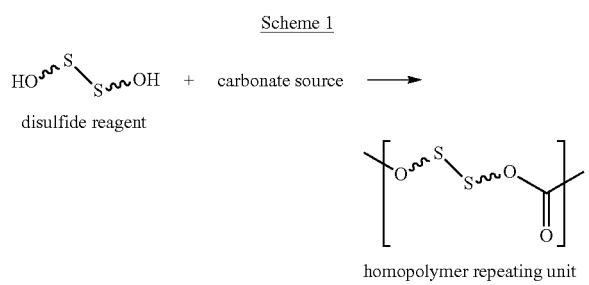

homopolymer repeating unit

When copolycarbonates are prepared, the disulfide reagent is reacted with a carbonate source and one or more co-monomer. See, Scheme 2 which illustrates the preparation of a repeat unit in a healable co-polycarbonate described herein. In this scheme, the carbonate source, disulfide reagent, and monomer are defined above.

Scheme 2

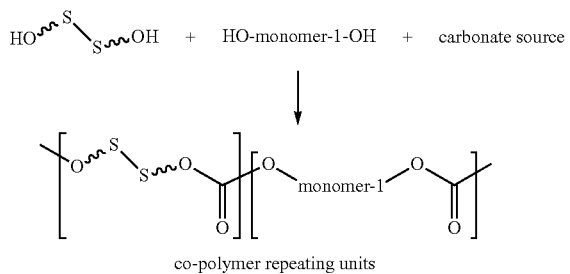

co-polymer repeating units

Similarly, Scheme 3 illustrates the preparation of a repeat unit in a healable terpolycarbonate described herein. In this scheme, the carbonate source, disulfide reagent, and first and second co-monomers are defined above.

Scheme 3

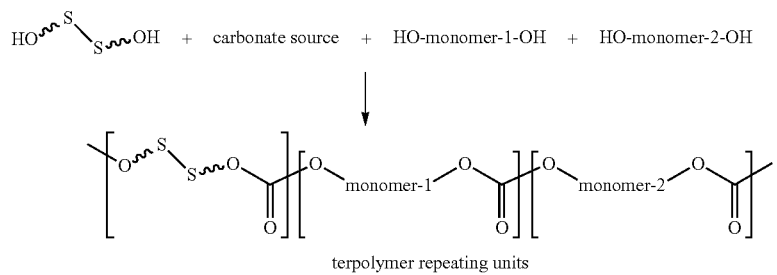

terpolymer repeating units

The polycarbonates are prepared in a suitable solvent, which may be selected by one skilled in the art. As used herein, the term "solvent" can refer to a single solvent or a mixture of solvents. In certain embodiments, the solvent is aqueous (i.e., contains water) or organic. The solvent does not react with or degrade any of the reactants. In some embodiments, the solvent comprises a halogenated aliphatic solvent, a halogenated aromatic solvent, a non-halogenated aromatic solvent, a non-halogenated aliphatic solvent, or a mixture thereof. Halogenated aromatic solvents include, without limitation, ortho-dichlorobenzene, chlorobenzene and the like. Non-halogenated aromatic solvents comprise, without limitation, toluene, xylene, anisole, phenol, 2,6-dimethylphenol, and the like. Halogenated aliphatic solvents include, without limitation, methylene chloride, chloroform, 1,2-dichloroethane, and the like. Non-halogenated aliphatic solvents include, without limitation, ethanol, acetone, ethyl acetate, cyclohexanone, and the like.

The choice of conditions of the preparation methods can be adjusted depending on the reactivity and melting points of the reactants to provide a convenient reaction rate. In this method, the molecular weight of resulting polycarbonate resins can be manipulated by controlling, among other factors, the type of vessel or extruder, the extruder screw design and configuration, the residence time in the vessel or extruder, the feed rate of the reactants, the reaction temperature, and the pressure in the vessel/reactor or on the extruder. The molecular weight of the polycarbonate resin can also depend on the purity and chemical structures of employed reactants.

The reactants for the polymerization are added to a reactor or vessel. The reactor may be equipped with one or more heating mantles for heating the reactants and/or pressure reducing devices (e.g., vents) for removing byproducts.

The reactor may be purged with an inert gas such as nitrogen or helium. Purging may be performed prior to or concurrently with the reaction. The reactor may also be treated using techniques known in the art to remove contaminants which may affect formation of the polycarbonate.

The method may be performed at a temperature of between about 100° C. and about 340° C. In some embodiments, the temperature is between about 100° C. and about 280° C. In other embodiments, the temperature is between about 140° C. and about 240° C.

While the reaction mixture is heated, the pressure over the reaction mixture may be reduced from ambient pressure to a final pressure in a range between about 0.001 mmHg and about 400 mmHg. In some embodiments, the pressure is about 0.01 mmHg to about 100 mmHg. In other embodiments, the pressure is about 0.1 mmHg t about 10 mmHg. Control of the pressure over the reaction mixture allows the orderly removal of any by-products. In some embodiments, the reaction may be conducted at sub-ambient pressure. In an alternate embodiment, the reaction may be conducted at slightly elevated pressure, for example a pressure in a range between about 1 and about 2 atmospheres.

A number of by-products may be formed during formation of the polycarbonate. In certain embodiments, the polycarbonate resin has less than about 1000 parts per million (ppm) of by-product. In other embodiments, the polycarbonate resin has less than about 500 ppm of by-products. In further embodiments, the polycarbonate resin has less than about 100 ppm by-product.

The methods described herein can be conducted as a batch or a continuous process. Any desired apparatus can be used for the reaction. The material and the structure of the reactor used herein is not particularly limited as long as the reactor has an ordinary capability of stirring and the presence of catalyst can be controlled. The reactor may be capable of stirring in high viscosity conditions as the viscosity of the reaction system is increased in later stages of the reaction.

The reaction mixture may optionally be blended with any conventional additives used in thermoplastics applications, such as preparing molded articles. These additives include, without limitation, UV stabilizers, antioxidants, heat stabilizers, mold release agents, coloring agents, antistatic agents, slip agents, antiblocking agents, lubricants, anticlouding agents, coloring agents, natural oils, synthetic oils, waxes, organic fillers, inorganic fillers, branching agents and mixtures thereof.

By way of example, Scheme 4 illustrates an interfacial polymerization of BPA with BPS to produce a healable polycarbonate resin.

Scheme 4

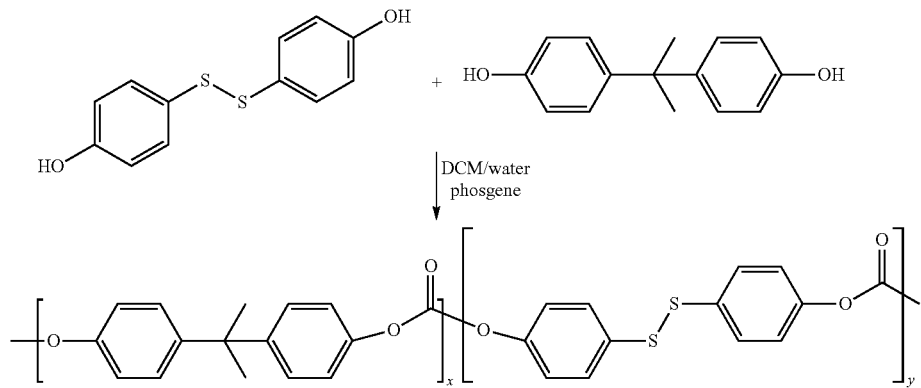

Scheme 5 illustrates a melt polymerization of BPS and BPA in the presence a carbonate source such as bis (methyl salicylate)carbonate (BMSC) or diphenyl carbonate (DPC) to produce a healable polycarbonate.

Scheme 5

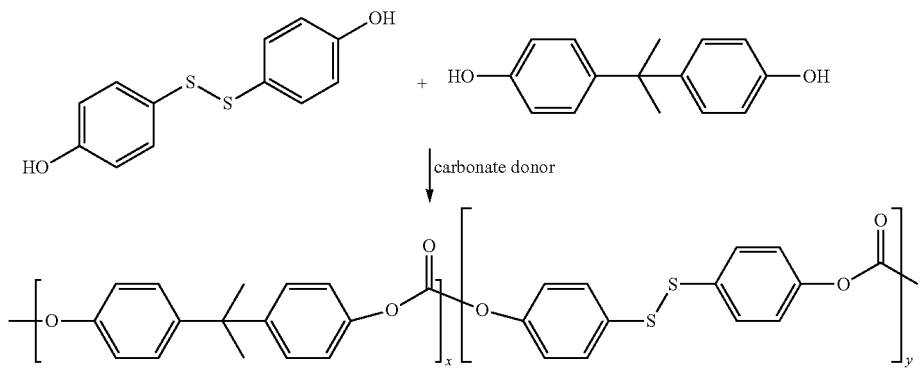

Scheme 6 illustrates the interfacial preparation of a healable terpolymer of BPA, siloxane and BPS units.

Scheme 6
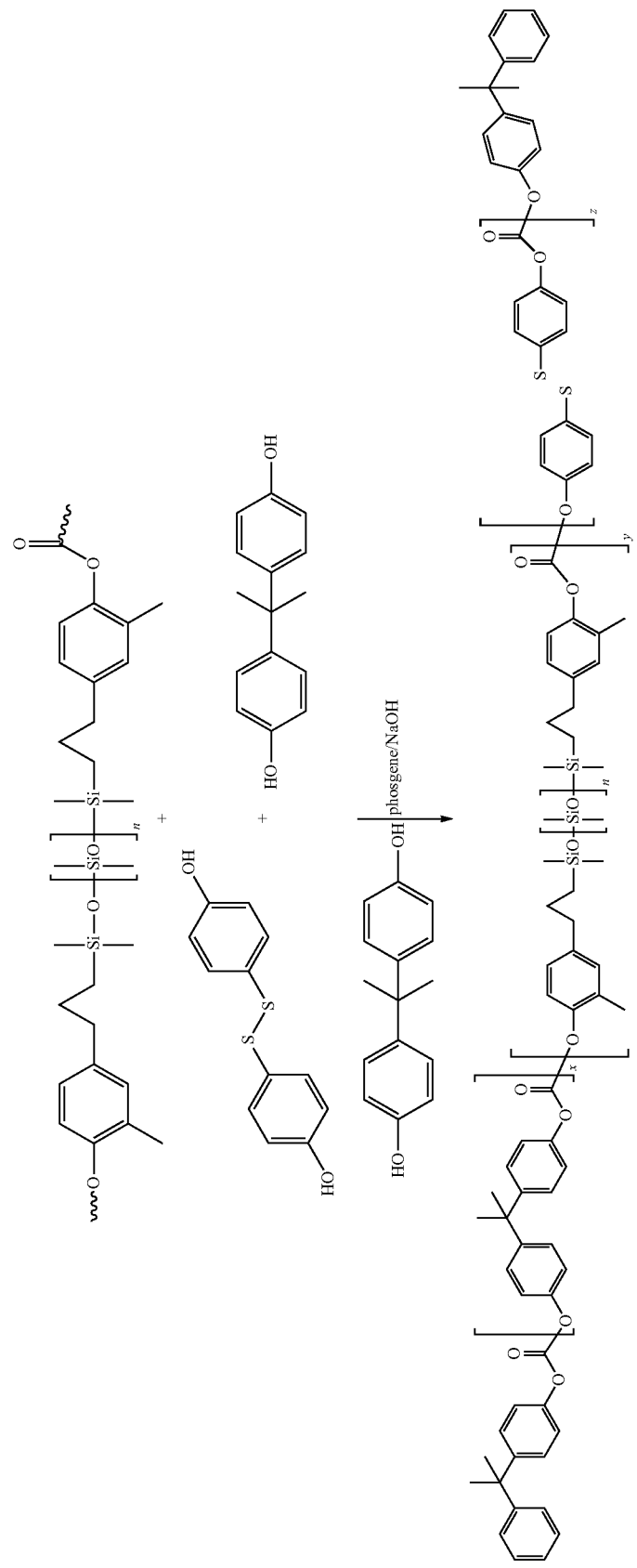

Scheme 7 illustrates the preparation of a healable terpolymer of BPA, PPPBP, and BPS via interfacial polymerization.

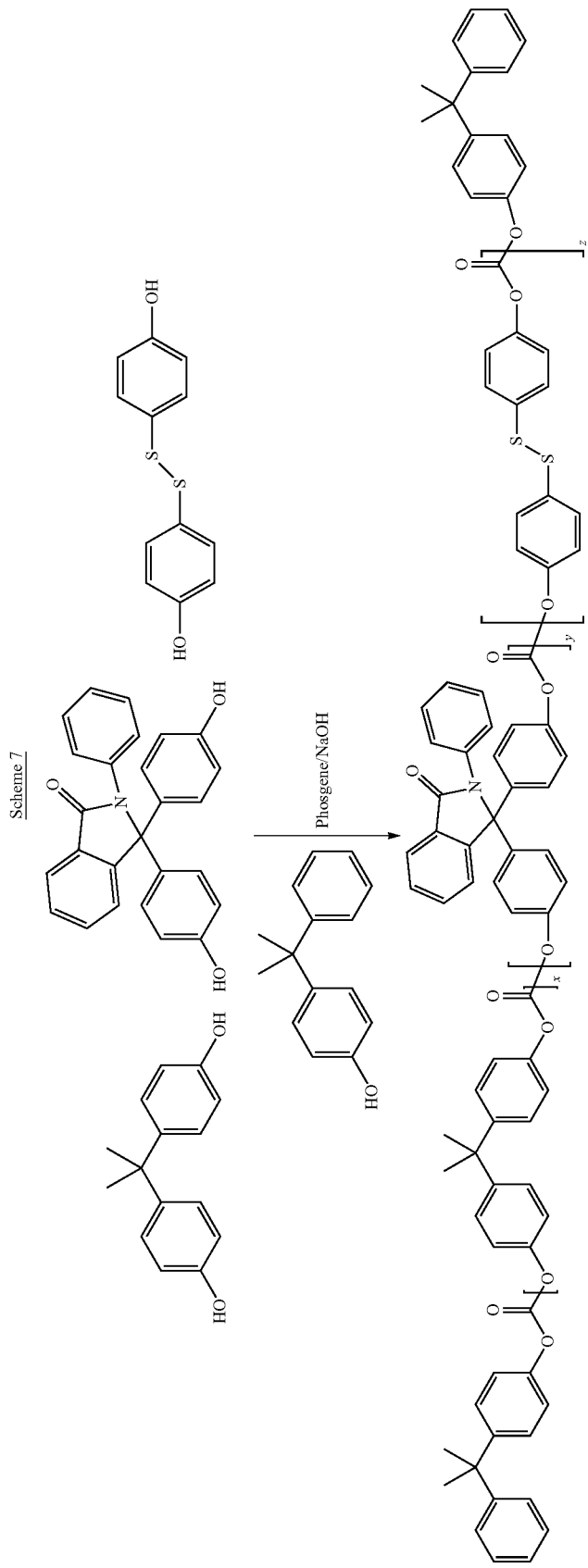

Scheme 8 illustrates the preparation of a healable terpolymer of BPA, sebacic acid and BPS units via interfacial polymerization.

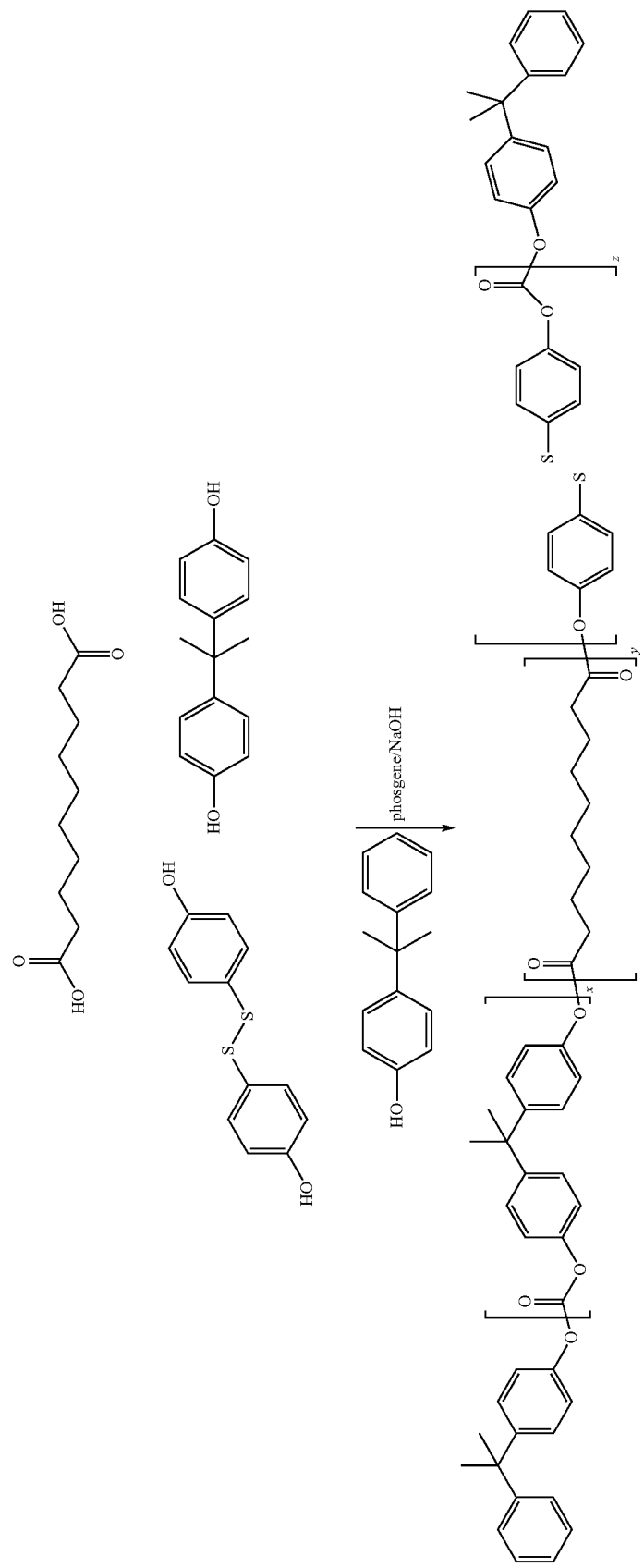

IV. Articles

Articles comprising the healable polycarbonate resin described herein are also contemplated. The bulk or entirety of the article may comprise the polycarbonate resin. Alternatively, or in addition to, the polycarbonate resin may be applied as a coating on the article. The term "coating" as used herein refer to a layer of a material which is applied to a substrate. The coating may be placed on the substrate or attached thereto. The coating may be attached to the substrate using means known in the art such as adhesion. The coating may alternatively, be chemically attached to the substrate using reactions known to those skilled in the art. A polycarbonate resin coating may be any thickness and will depend on the particular substrate and industry, among others.

The industries where the polycarbonate resins described herein may be used include, without limitation, lithium ion batteries, pipes for water, oil, and gas, fire resistance, antifouling, and outdoor applications such consumer electronics, electrical and lighting, automotive (including automotive interiors and exteriors), and aircraft industries, among others. In some embodiments, the articles include, without limitation, polymers such as a plastic, glass, or metal which are optionally molded. The healable polycarbonate resin may also be applied a coating on the article.

In certain embodiments, molded articles comprising the polycarbonate resins as described herein may be obtained by conventional molding techniques. The molding techniques may include, without limitation, injection molding, blow molding, and compression molding. Molded articles may also be prepared from a blend of the polycarbonate resin with one or more additional polymers. Such blends may be prepared using extrusion methods may be molded using conventional techniques. In certain embodiments, the molded article is prepared using injection molding. The inventive polycarbonate can be used for additive manufacturing (e.g., 3D printing, fused deposition molding (FDM), selective additive manufacturing (SLS), big area additive manufacturing (BAAM), LFAM,) composites, films, sheets, lenses, bezels, and the like.

V. Aspects

The present disclosure comprises at least the following aspects.

Aspect 1. A healable polycarbonate resin comprising at least about 5 mol % to about 50 mole % of disulfide units.

Aspect 2. The healable polycarbonate resin of aspect 1, wherein said disulfide units comprise aromatic or aliphatic disulfide units.

Aspect 3. The healable polycarbonate resin of aspect 1, comprising about 10 mol % to about 50 mol % of said disulfide units.

Aspect 4. The healable polycarbonate resin of aspect 1 or 2, wherein said disulfide units comprise at least one hydroxy group.

Aspect 5. The healable polycarbonate resin of any of the preceding aspects, wherein said disulfide units comprise disulfide co-monomers.

Aspect 6. The healable polycarbonate resin of any of the preceding aspects, wherein said polycarbonate resin comprises disulfide end caps.

Aspect 7. The healable polycarbonate resin of any of the preceding aspects, wherein said polycarbonate resin comprises disulfide cross-linkers.

Aspect 8. The healable polycarbonate resin of any of the preceding aspects, further comprising optionally substituted carbonate monomers.

Aspect 9. The healable polycarbonate resin of any of the preceding aspects, wherein said polycarbonate resin comprises bisphenol A monomers, bis(methyl salicylate)carbonate monomers, N-phenyl phenolphthalein monomers, diphenyl carbonate monomers, or combinations thereof.

Aspect 10. The healable polycarbonate resin of aspect 1, wherein said polycarbonate resin comprises units selected from the group consisting of:

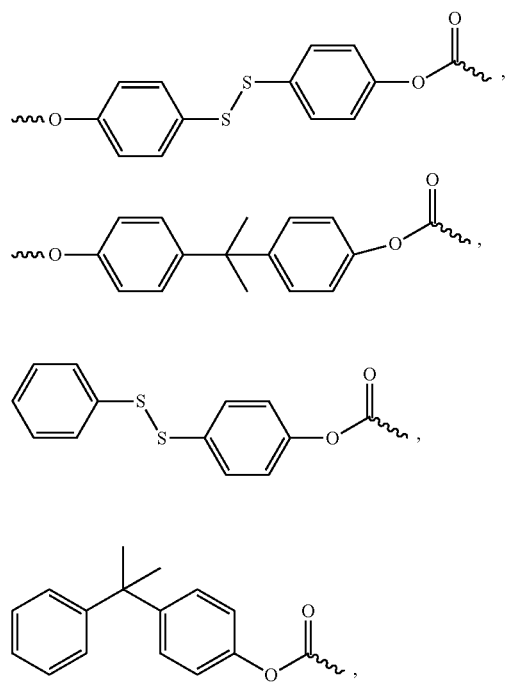

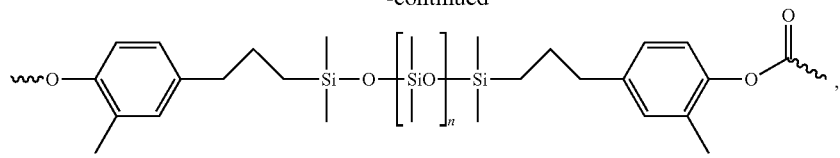
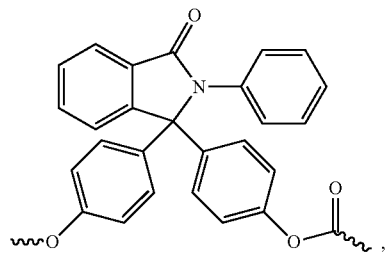
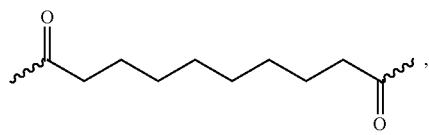
and combinations thereof.
Aspect 11. The healable polycarbonate resin of aspect 1, wherein said polycarbonate resin comprises
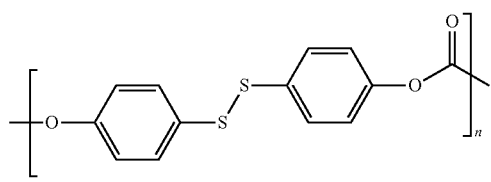
wherein n is about 30 to about 325,
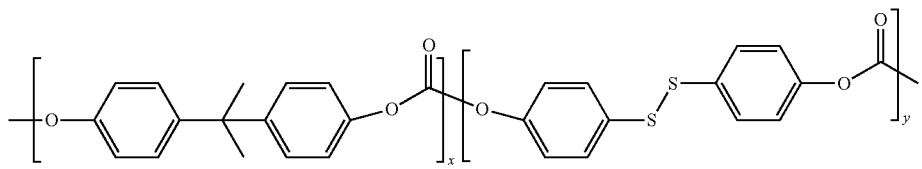
wherein x and y are, independently, about 5 to about 95 mole % and $M_w$ is about 10,000 to about 100,000 g/mol;
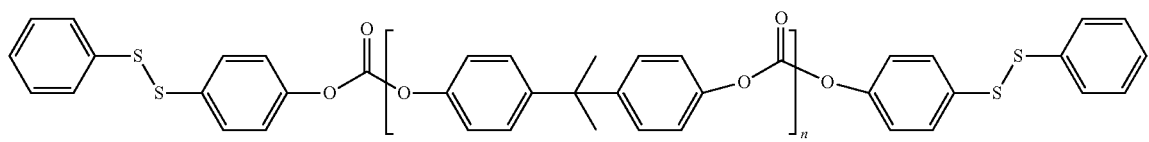
wherein n is an integer provided that $M_w$ is about 10.000 to about 100.000 g/mol;

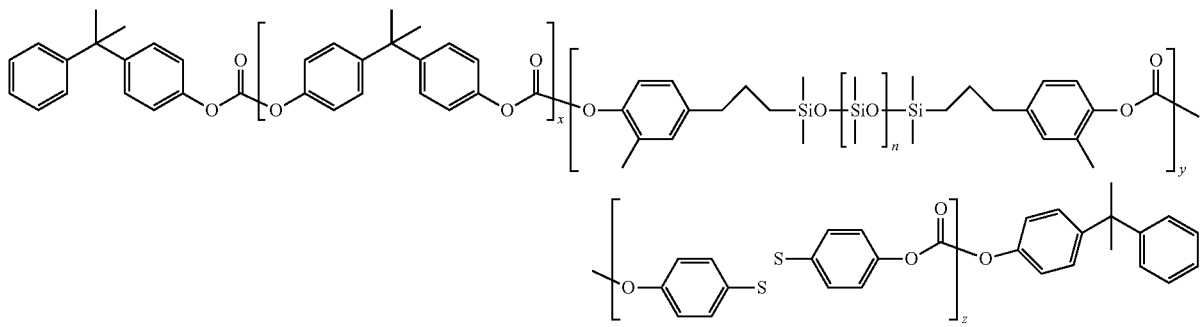

wherein n is about 20 to about 60 mol %, x is about 1 to about 60 mol %, y is about 1 to about 10 mol %, z is about 1 to about 50 mol % and $M_w$ is about 10,000 to about 100,000 g/mol;

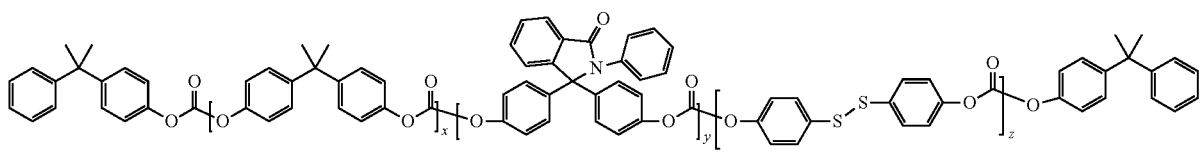

wherein x is about 1 to about 50 mol %, y is about 1 to about 30 mol %, z is about 1 to about 30 mol % and $M_w$ is about 10.000 to about 100.000 g/mol; or

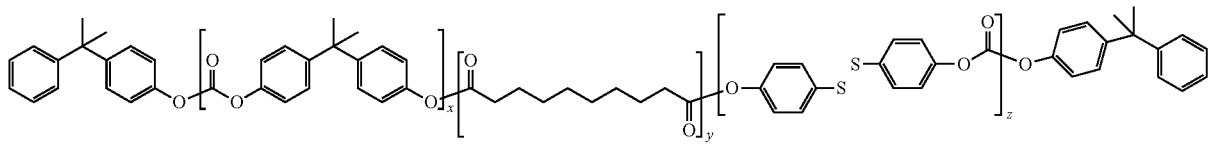

wherein x is about 1 to about 60 mol %, y is about 1 to about 10 mol %, z is about 1 to about 50 mol % and $M_w$ is about 10.000 to about 100.000 g/mol.

Aspect 12. The healable polycarbonate resin of any of the preceding aspects, which heals in the absence of pressure, electricity, a healing agent, a catalyst, or combinations thereof.

Aspect 13. The healable polycarbonate resin of aspect 1, which heals in the presence of heat or radiation.

Aspect 14. The healable polycarbonate resin of any of the preceding aspects, which is capable of multiple healings over time.

Aspect 15. The healable polycarbonate resin of any of the preceding aspects which lacks carbon nanotubes, self-healing agents, self-healing layers, or a combination thereof.

Aspect 16. A method of preparing a healable polycarbonate resin of aspect 1, said method comprising melt or interfacial polymerizing an aromatic disulfide comprising at least one hydroxyl group and a carbonate source such as bis(methyl salicylate)carbonate, diphenyl carbonate or phosgene, and optionally a co-monomer.

Aspect 17. The method of aspect 16, wherein said co-monomer is bisphenol A, N-phenyl phenolphthalein, an acid having at least about 20 carbon atoms, or

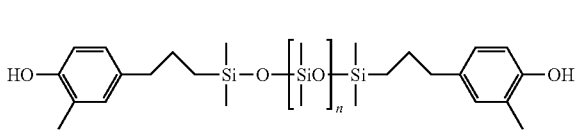

wherein n is about 20 to about 200, or combinations thereof.

Aspect 18. The method of aspect 16 or 17, wherein said aromatic disulfide is bis(4-hydroxyphenyl)disulfide, 4-(phenyldisulfanyl)phenol, 4,4',4"-((ethane-1,1,1-triyl-tris(benzene-4,1-diyl))tris(disulfanediyl))triphenol, or combinations thereof.

Aspect 19. An article comprising the healable polycarbonate resin of any one of aspects 1 to 14.

Aspect 20. The article of claim 19, wherein the article is formed using one or more of injection molding and additive manufacturing.

Aspect 21. A method of activating a healable polycarbonate resin of any one of aspects 1 to 14, comprising exposing said healable polycarbonate resin to heat or radiation.

VI. Examples

The invention is illustrated by the following non-limiting examples. In these examples, the reactants for the polymerization reaction were fed to the reactor in solid (e.g. powder) form. The reactor was equipped with heating mantles and pressure reducing devices (e.g., vents) that served to heat the reactants and remove the activated phenol byproduct, respectively, and thus drive the polymerization reaction toward completion.

Comparative Example

A glass tube was charged with 10 g bis-methyl salicyl carbonate (BMSC) and 6.75 g of bisphenol-A (BPA) and added with catalytic amounts of aqueous sodium hydroxide (0.005 millimole/mole (mmol/mol) of BPA) and aqueous tetramethylammonium hydroxide (TMAH; 0.15 mmol/mol of taken bis-phenols). The reactants were heated in a melt reactor as per temperature-pressure profile (shown in Table 1) for a given time period in inert media. At the end of the reaction, the polycarbonate sample was removed as strands by breaking the bottom of the glass tube.

TABLE 1

| Step | Temperature (° C.) | | Pressure (millibar) | Time (minutes) |
|---|---|---|---|---|
| | Reactor | Condenser | | |
| 1 | 180 | 120 | 915 | 15 |
| 2 | 220 | 120 | 915 | 15 |
| 3 | 230 | 120 | 100 | 15 |
| 4 | 300 | 120 | 0 | 7.5 |

Example 1

A glass tube was charged with 10 g bis-methyl salicyl carbonate (BMSC), 5.4 g BPA and 1.48 g bis(4-hydroxyphenyl)disulfide (BPS) and added with catalytic amounts of aqueous sodium hydroxide (0.005 mmol/mol of taken bis-phenols) and aqueous TMAH (0.15 mmol/mol of taken bis-phenols). The reactants were heated in a melt reactor as per temperature-pressure profile (Table 2) for a given time period in inert media. At the end of the reaction, the healable BPA-BHS polycarbonate sample was removed as strands by breaking the bottom of the glass tube.

TABLE 2

| Step | Temperature (° C.) | | Pressure (millibar) | Time (minutes) |
|---|---|---|---|---|
| | Reactor | Condenser | | |
| 1 | 180 | 120 | 915 | 10 |
| 2 | 220 | 120 | 915 | 10 |
| 3 | 250 | 120 | 100 | 10 |
| 4 | 295 | 120 | 0 | 5 |

Example 2

A glass tube was charged with 10 g BMSC, 5.73 g BPA and 1.11 g BPS and added with catalytic amounts of aqueous sodium hydroxide (0.005 mmol/mol of taken bis-phenols) and aqueous TMAH (0.15 mmol/mol of taken bis-phenols). The reactants were heated in a melt reactor as per temperature-pressure profile (Table 2) for a given time period in inert media. At the end of the reaction, the BPA-BHS polycarbonate sample was removed as strands by breaking the bottom of the glass tube.

Example 3

A glass tube was charged with 10 g BMSC, 6 g BPA and 0.74 g BPS was added with catalytic amounts of aqueous sodium hydroxide (0.005 mmol/mol of taken bis-phenols) and aqueous TMAH (0.15 mmol/mol of taken bis-phenols). The reactants were heated in a melt reactor as per the temperature-pressure profile in Table 2 for a given time period in inert media. At the end of the reaction, the BPA-BHS polycarbonate sample was removed as strands by breaking the bottom of the glass tube.

Example 4

A glass tube was charged with 10 g BMSC, 6.4 g BPA and 0.37 g BHS and added with catalytic amounts of aqueous sodium hydroxide (0.005 mmol/mol of taken bis-phenols) and aqueous TMAH (0.15 mmol/mol of taken bis-phenols). The reactants were heated in a melt reactor as per the temperature-pressure profile in Table 2 for a given time period in inert media. At the end of the reaction, the BPA-BHS polycarbonate sample was removed as strands by breaking the bottom of the glass tube.

Example 5

To study the healable behavior of the synthesized samples, solution casted films were prepared. For this purpose, 3% (weight/vol) solution of resin samples corresponding to Examples 1-4 were made in dichloromethane and subsequently poured in a Petri dish. Solvent was allowed to evaporate in a closed hood, overnight. Finally, transparent films were further dried at 55° C. for 12 hours (h) in a vacuum oven.

The molecular weights of the synthesized polycarbonate resins were analyzed by gel permeation chromatography (GPC) and results are shown in Table 3. GPC analysis was carried out on Shimadzu VP instrument, equipped with a cross-linked styrene-divinyl-benzene column and UV-detector. Molecular weight was determined using polystyrenes as standards. Samples were dissolved in DCM and filtered through 0.4 micron PTFE filters before injecting into the column.

TABLE 3

Molecular weight analysis of synthesized samples

| Example | BPA (Mole %) | BHS (Mole %) | $M_w$ | $M_n$ | $M_w/M_n$ | Glass Transition Temp. (° C.) |
|---|---|---|---|---|---|---|
| Comparative | 100 | 0 | 35,306 | 17,274 | 2.04 | 145 |
| 1 | 80 | 20 | 36,391 | 13,605 | 2.67 | 126 |
| 2 | 85 | 15 | 31,842 | 13,343 | 2.38 | 131 |
| 3 | 90 | 10 | 42,164 | 14,462 | 2.91 | 135 |
| 4 | 95 | 5 | 37,594 | 12,569 | 2.99 | 139 |

Figure 2:
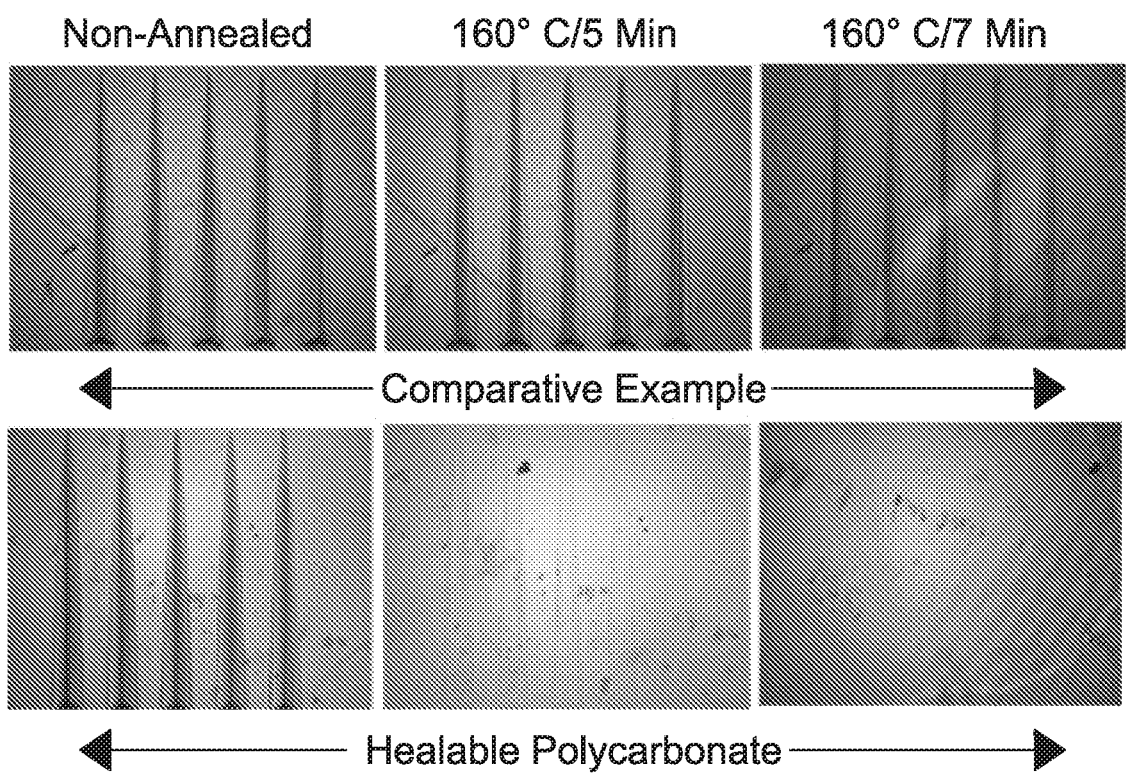
FIG. 2 are microscopic images of scratches made on polycarbonate (comparative example) and healable polycarbonate films before and after thermal annealing.

In order to demonstrate the healable property controlled scratches on solution casted films were made with Nano-Indenter® XP (Keysight Technologies, CA, USA). A three-sided Berkovich diamond tip with end diameter-50 nm is used scratch experiments. In this experiment, progressive load (0-120 mN) was used while scratch velocity was held constant throughout the scratch experiment at 10 µm/s. A typical scratch marks on the sample surface is visualized using optical microscope attached with the Nano-indenter. Optical microscope and indenter tip are calibrated for imaging the same location at which the indenter is creating the scratch. The samples were exposed to 165° C. in an oven for 5 minutes and then an additional 2 minutes for a total of 7 minutes. As shown in FIG. 2, no change in the morphology of the scratches was observed in the case of polycarbonate film prepared in the comparative example. On the other hand, scratches on the BPA-BHS polycarbonate of example 1 significantly healed after 5 minutes exposure and completely disappeared on 7 minutes exposure time. These data suggest that the polycarbonates described herein show temperature-induced healability.

Figure 3:
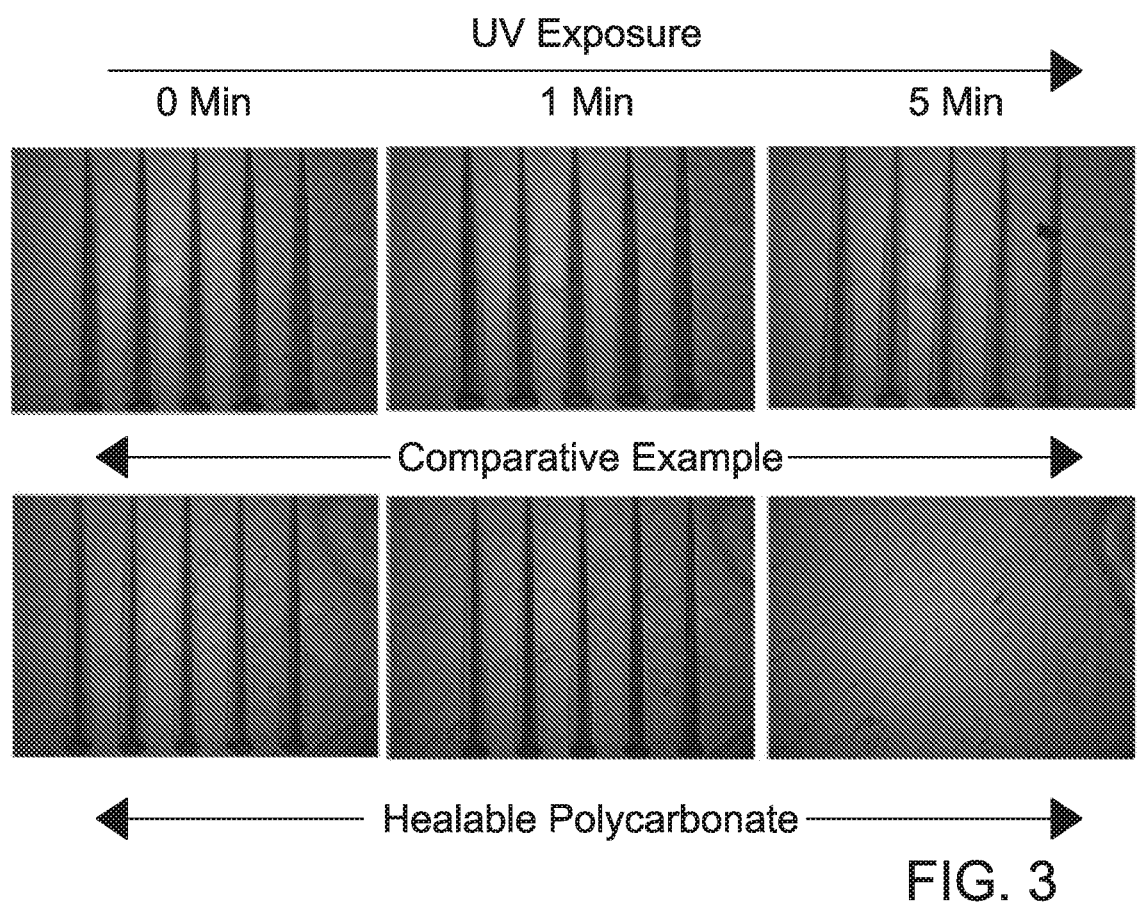
FIG. 3 are microscopic images of scratches made on polycarbonate (comparative example) and healable polycarbonate films before and after UV-exposure.

To study the healability of BPA-BPS copolymer using UV exposure, scratches made on solution casted films were exposed to UV radiations in UV flood curing system with power (120 milliwatt/cm$^2$). As observed in FIG. 3, unlike the polycarbonate film of the comparative example, the BPA-BPS polycarbonate of Example 1 healed after 5 minutes of UV exposure to UV radiations, with scratches in the BPA-BPS polycarbonate disappearing. These data suggest that the polycarbonates show UV-induced healability.

Figure 4:
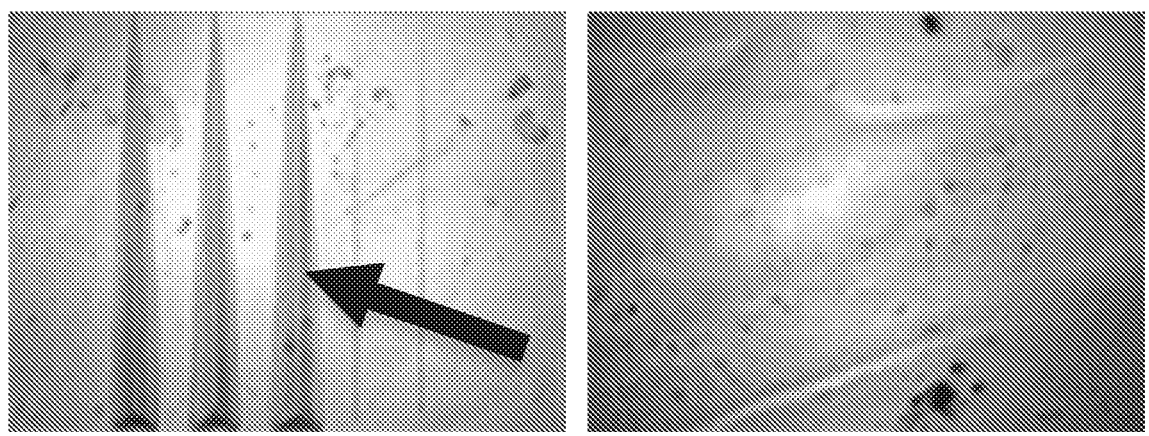
FIG. 4 are microscopic images of scratches made on healable polycarbonate films prepared in examples 2-4, before and after thermal annealing.
Figure 4:
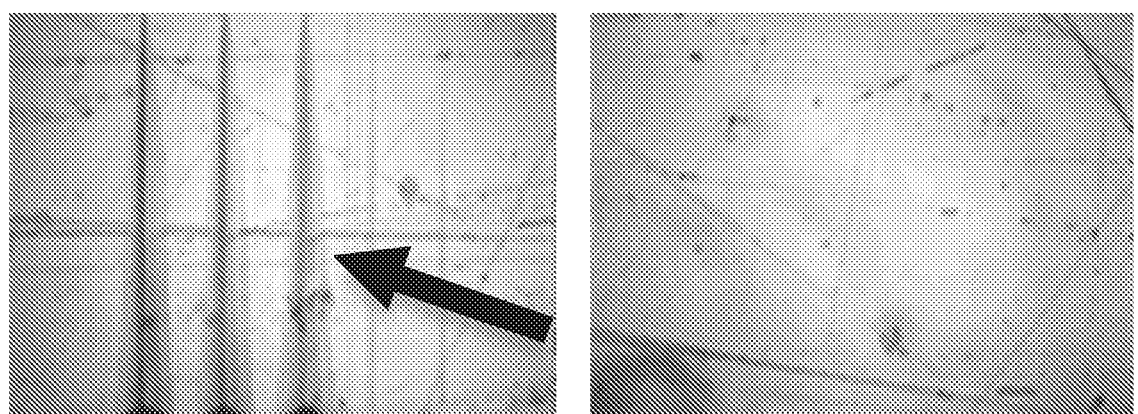
Figure 4:
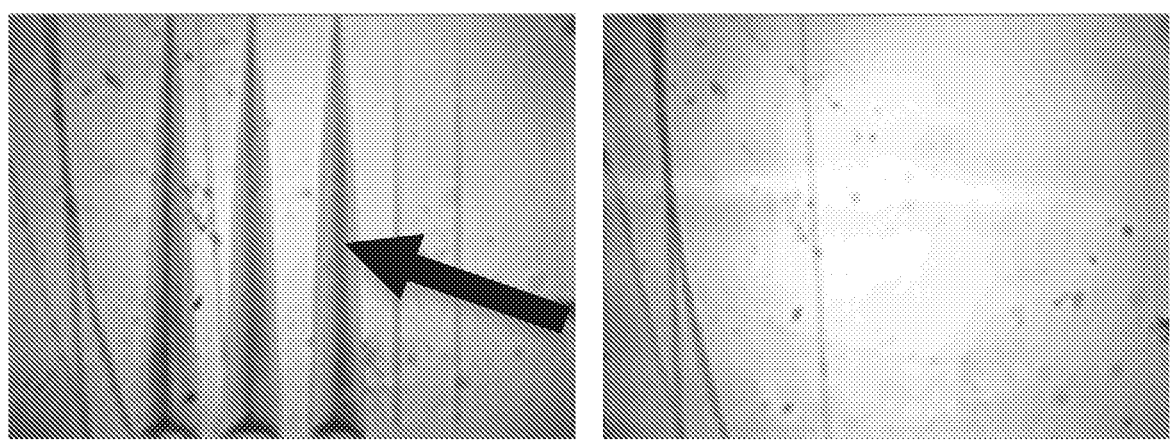

To study the healable behavior of the polycarbonate resins below 20 mole % BPS content, samples with 15 mole %, 10 mole %, and 5 mole % BPS contents were prepared as described in examples 2, 3 and 4, respectively. FIG. 4 shows microscopic images of scratches (shown by arrow) made on solution casted films of these compositions before and after thermal annealing at 165° C. for 6 minutes. The healing of scratches in all the compositions was observed after thermal treatment. These results illustrate that healable behavior occurs in polycarbonate resins having at least about 5 mole % of BPS co-monomer in polycarbonate chain.

To study the repeatability in healable behavior of disulfide containing polycarbonate resins, solution casted film prepared from 5 mole % BPS composition of example 4 was subjected to scratches and then thermal annealing at 165° C. for 5 minutes for multiple cycles, with the scratches being made substantially in the same location of the film. No change in healing properties was observed after 10 scratching sequences. These results confirm that the polycarbonates discussed herein are capable of healing the multiple events of damage.

What is claimed:

1. A healable polycarbonate resin comprising at least about 10 mol % to about 50 mol % of disulfide units.

2. The healable polycarbonate resin of claim 1, wherein said disulfide units comprise aromatic or aliphatic disulfide units.

3. The healable polycarbonate resin of claim 1, wherein said disulfide units comprise at least one hydroxy group.

4. The healable polycarbonate resin of claim 1, wherein said disulfide units comprise disulfide co-monomers.

5. The healable polycarbonate resin of claim 1, wherein said polycarbonate resin comprises disulfide end caps.

6. The healable polycarbonate resin of claim 1, wherein said polycarbonate resin comprises disulfide cross-linkers.

7. The healable polycarbonate resin of claim 1, further comprising a dihydroxy co-monomer such as a bisphenol A monomer, N-phenyl phenolphthalein monomer, an acid having at least about 20 carbon atoms, or

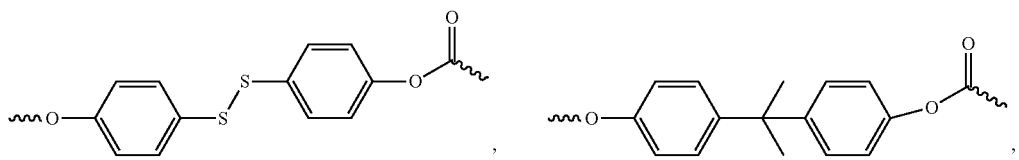

wherein n is about 20 to about 200, or combinations thereof.

8. The healable polycarbonate resin of claim 1, wherein said polycarbonate resin is synthesized in presence of a carbonate source such as bis(methyl salicylate)carbonate diphenyl, or phosgene.

9. The healable polycarbonate resin of claim 1, wherein said polycarbonate resin comprises units selected from the group consisting of:

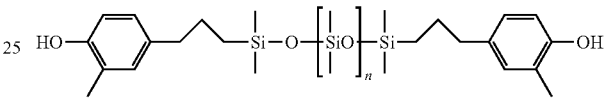

,

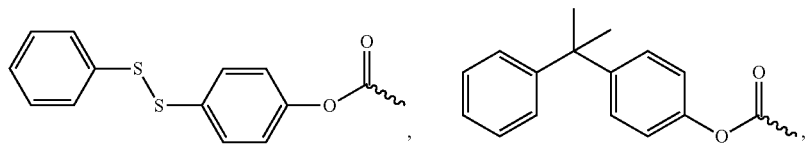

,

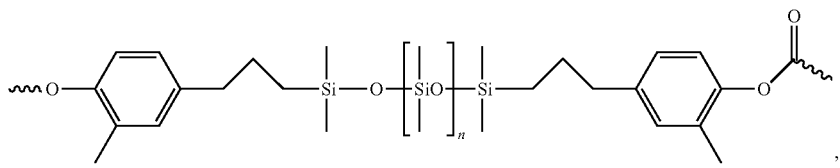

,

-continued
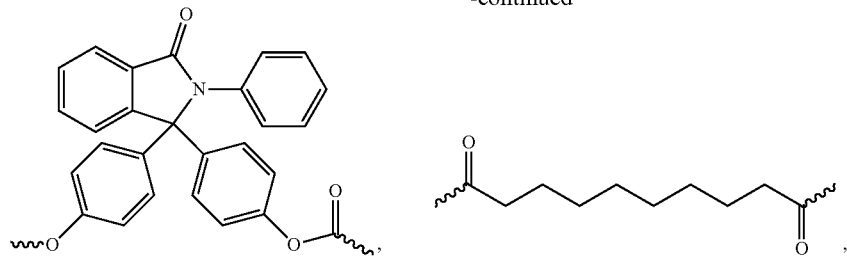
and combinations thereof.
10. The healable polycarbonate resin of claim 1, wherein said polycarbonate resin comprises
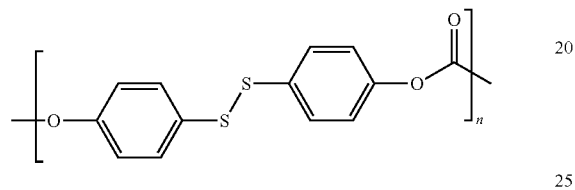
wherein n is about 30 to about 325;
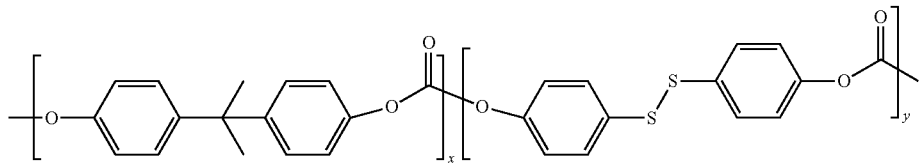
wherein x and y are, independently, about 5 to about 95 mole % and $M_w$ is about 10,000 to about 100,000 g/mol;
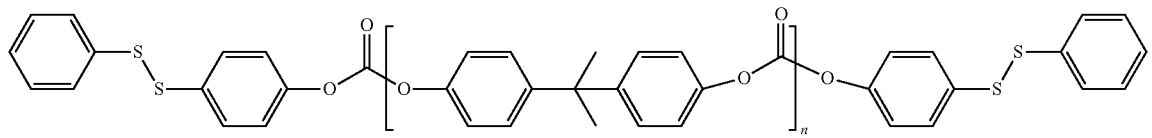
wherein n is an integer provided that $M_w$ is about 10,000 to about 100,000 g/mol;
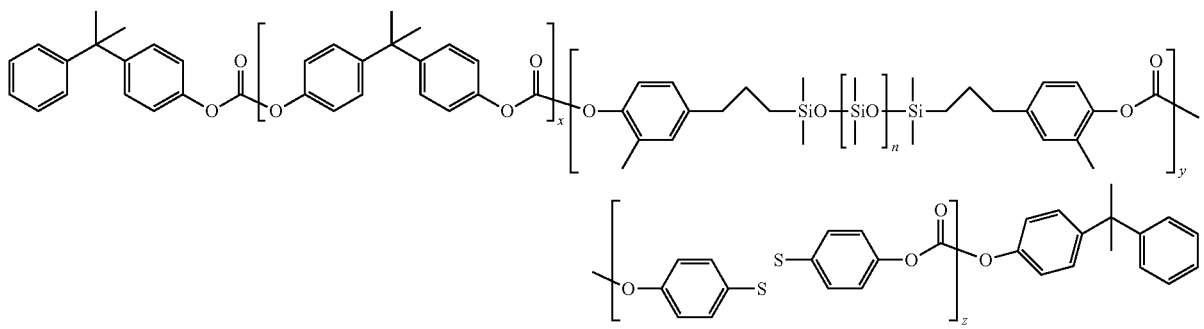

wherein n is about 20 to about 60 mol %, x is about 1 to about 60 mol %, y is about 1 to about 10 mol %, z is about 1 to about 50 mol % and $M_w$ is about 10,000 to about 100,000 g/mol;

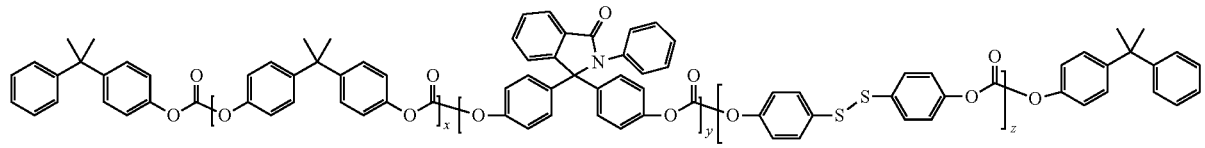

wherein x is about 1 to about 50 mol %, y is about 1 to about 30 mol %, z is about 1 to about 30 mol % and $M_w$ is about 10,000 to about 100,000 g/mol; or

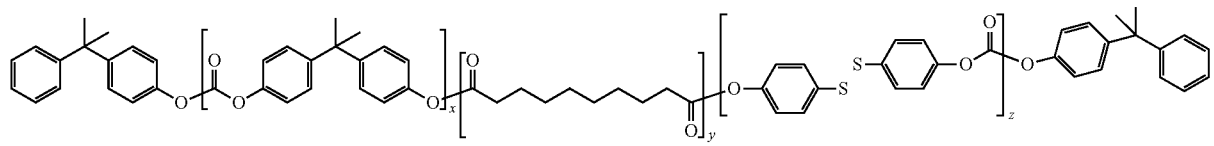

wherein x is about 1 to about 60 mol %, y is about 1 to about 10 mol %, z is about 1 to about 30 mol %, and $M_w$ is about 10,000 to about 100,000 g/mol.

11. The healable polycarbonate resin of claim 1, which heals in the absence of pressure, electricity, a healing agent, a catalyst, or combinations thereof.

12. The healable polycarbonate resin of claim 1, which heals in the presence of heat or radiation or a combination of thereof.

13. The healable polycarbonate resin of claim 1, which is capable of healing multiple events of damage.

14. The healable polycarbonate resin of claim 1 which lacks carbon nanotubes, self-healing agents, or a combination thereof.

15. A method of preparing a healable polycarbonate resin of claim 1, said method comprising melt or interfacial polymerizing an aromatic disulfide comprising at least one hydroxyl group and a carbonate source such as bis(methyl salicylate)carbonate or diphenyl carbonate or phosgene, and optionally a co-monomer.

16. The method of claim 14, wherein said co-monomer is bisphenol A, N-phenyl phenolphthalein, an acid having at least about 20 carbon atoms, or

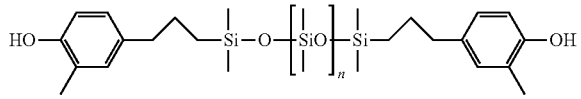

wherein n is about 20 to about 200, or combinations thereof.

17. The method of claim 14, wherein said aromatic disulfide is bis(4-hydroxyphenyl)disulfide, 4-(phenyldisulfanyl)phenol, 4,4',4''-((ethane-1,1,1-triyl-tris(benzene-4,1-diyl))tris(disulfanediyl))triphenol, or combinations thereof.

18. An article comprising the healable polycarbonate resin of claim 1.

19. A method of activating a healable polycarbonate resin of claim 1, comprising exposing said healable polycarbonate resin to heat or radiation.

* * * * *